US009928410B2

United States Patent
Yoo et al.

(10) Patent No.: US 9,928,410 B2
(45) Date of Patent: Mar. 27, 2018

(54) METHOD AND APPARATUS FOR RECOGNIZING OBJECT, AND METHOD AND APPARATUS FOR TRAINING RECOGNIZER

(71) Applicant: Samsung Electronics Co., Ltd., Suwon-si, Gyeonggi-do (KR)

(72) Inventors: Byungin Yoo, Seoul (KR); Namjoon Kim, Anyang-si (KR); Changkyo Lee, Seoul (KR); Chang Kyu Choi, Seongnam-si (KR); Jaejoon Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 20 days.

(21) Appl. No.: 14/938,365

(22) Filed: Nov. 11, 2015

(65) Prior Publication Data

US 2016/0148080 A1    May 26, 2016

(30) Foreign Application Priority Data

Nov. 24, 2014  (KR) .................. 10-2014-0164232
Jun. 18, 2015  (KR) .................. 10-2015-0086658

(51) Int. Cl.
*G06K 9/62* (2006.01)
*G06K 9/00* (2006.01)
*G06K 9/46* (2006.01)

(52) U.S. Cl.
CPC ..... *G06K 9/00302* (2013.01); *G06K 9/00281* (2013.01); *G06K 9/4628* (2013.01)

(58) Field of Classification Search
USPC ........ 382/157, 118, 159, 211, 229, 310; 1/1; 359/29, 559; 707/754, 783, 999.02, 707/E17.05; 715/209, 210, 230, 234
See application file for complete search history.

(56) References Cited

U.S. PATENT DOCUMENTS

| 5,185,815 A * | 2/1993 | Brandstetter ............ G06K 9/74 359/29 |
| 5,359,673 A * | 10/1994 | de La Beaujardiere ...... G06K 9/00442 382/229 |
| 6,732,090 B2 * | 5/2004 | Shanahan ......... G06F 17/30011 |
| 6,928,425 B2 * | 8/2005 | Grefenstette ..... G06F 17/30011 707/754 |
| 7,133,862 B2 * | 11/2006 | Hubert ............. G06F 17/30011 |

(Continued)

FOREIGN PATENT DOCUMENTS

| KR | 20030083510 A | 10/2003 |
| KR | 10-0714112 B1 | 4/2007 |
| KR | 20110101675 A | 9/2011 |

OTHER PUBLICATIONS

Yaniv Taigman et al., "DeepFace: Closing the Gap to Human-Level Performance in Face Verification," Facebook AI Research, 2014, Menlo Park, CA, USA, pp. 8.

(Continued)

*Primary Examiner* — Anh H Do
(74) *Attorney, Agent, or Firm* — Harness, Dickey & Pierce, P.L.C.

(57) ABSTRACT

A recognition method includes receiving an input image; and recognizing a plurality of elements associated with the input image using a single recognizer pre-trained to recognize a plurality of elements simultaneously.

35 Claims, 33 Drawing Sheets

(56) References Cited

U.S. PATENT DOCUMENTS

2011/0243461 A1 10/2011 Nayar et al.
2013/0148860 A1 6/2013 Musatenko et al.
2013/0243274 A1 9/2013 Sukegawa et al.
2013/0329970 A1 12/2013 Irie et al.

OTHER PUBLICATIONS

Devries et al., "Multi-Task Learning of Facial Landmarks and Expression," 2014 Canadian Conference on Computer and Robot Vision, May 6, 2014, p. 98-103, IEEE, XP032596790.
European Search Report for European Patent Application No. 15195818.8 dated Mar. 31, 2016.

* cited by examiner

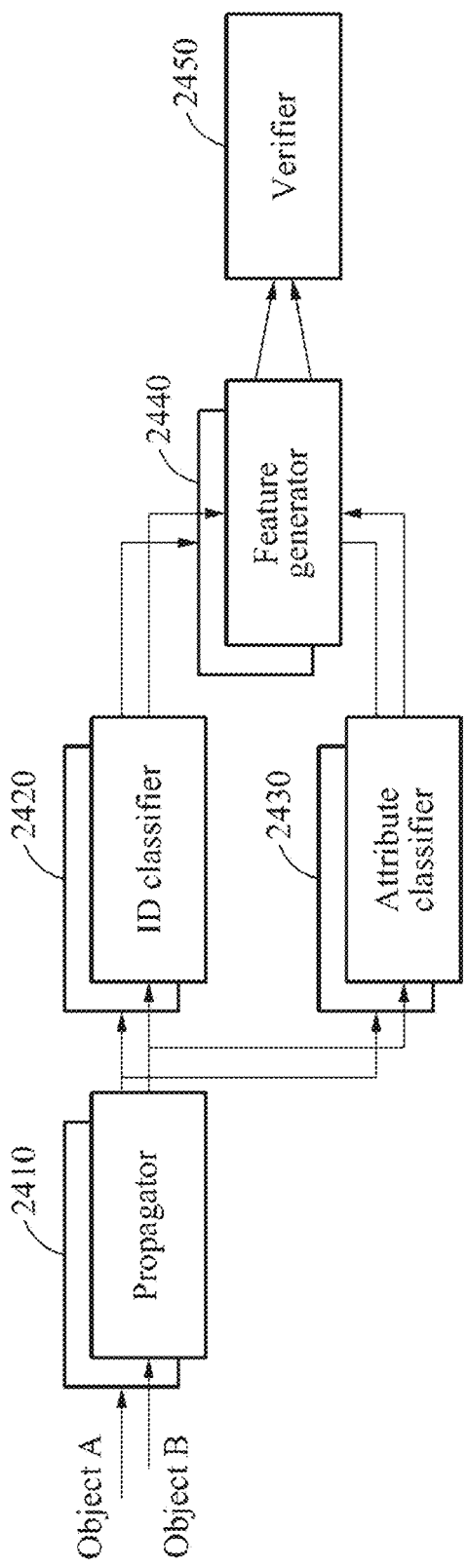

FIG. 25

| Region | Dim. | Attributes | Image Size |
|---|---|---|---|
| Holistic Face | 17 | Age(6D), Gender(2D), Ethnic Group(3D), Attractiveness(2D), Face Shapes(3D),Fatness(1D) | 128×128 |
| Eyes | 24 | Eye Shape(12D),Eyebrow(5D), Eye color(7D) | 128×40 |
| Nose | 11 | Nose Shapes(11D) | 40×80 |
| Mouth | 11 | Mouse Shapes(10D), Bucktooth(1D) | 80×40 |
| Chin/Jaw | 5 | Chin/Jaw(5D) | 80×40 |
| Cheekbone | 1 | High Cheekbone(1D) | 128×40 |
| Nose-Mouth | 1 | Strong Nose-Mouth(1D) | 40×40 |
| Hairs | 13 | Hair Color(6D), Hair Style(7D) | 128×60 |

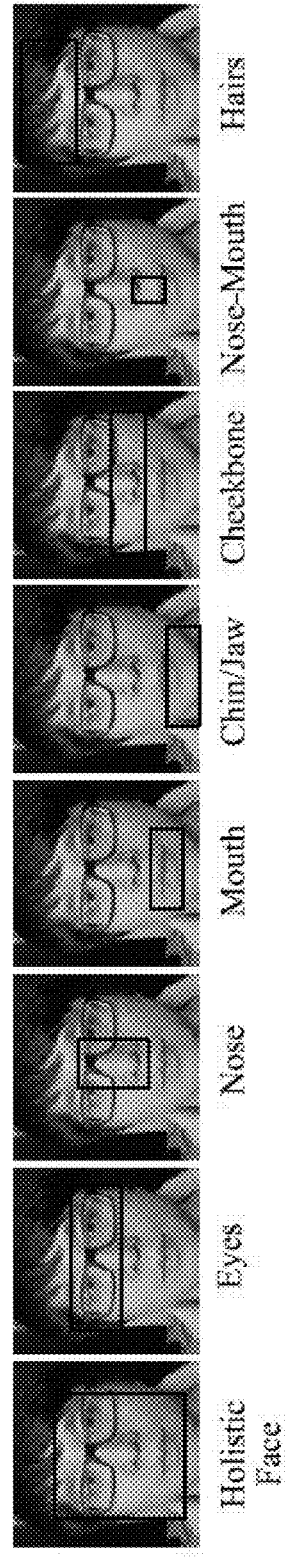

Holistic Face | Eyes | Nose | Mouth | Chin/Jaw | Cheekbone | Nose-Mouth | Hairs

FIG. 26

| Category | Attributes Names | Descriptions | Example Picture |
|---|---|---|---|
| Age (6D) | Baby | Baby (0~7) | |
| | Child | Child (8~12) | |
| | Youth | Youth (13~18) | |
| | Young age | Young age (19~40) | |
| | Middle age | Middle age (41~60) | |
| | Senior | Senior (61~) | |
| Gender (2D) | Male | Male | |
| | Female | Female | |
| Ethnic group (3D) | Asian | Asian | |
| | African | African | |
| | Caucasian | Caucasian | |
| Attractiveness (2D) | Attractive Man | Attractive Man | |
| | Attractive Woman | Attractive Woman | |

FIG. 27

| Category | Attributes Names | Descriptions | Example Picture |
|---|---|---|---|
| Eye shape (12D) | Cow-style | Cow-style eyes | |
| | Turtle-style | Turtle-style eyes | |
| | Yin-yang style (Mis-matched eyes) | Yin-yang style eyes | |
| | Horse-style | Horse-style eyes | |
| | Lion-style | Lion-style eyes | |
| | Monkey-style | Monkey-style eyes | |
| | Snake-style | Snake-style eyes | |
| | Dragon-style | Dragon-style eyes | |
| | Peach blossom-style | Peach blossom-style eyes | |
| | Mandarin duck-style | Mandarin duck-style eyes | |
| | Elephant-style | Elephant-style eyes | |
| | Big eye | Big eyes → Small eyes | |
| Eyebrow shape (5D) | Straight & Arrow | Straight eyebrow | |
| | Angled & Arched & Seagull | Arched eyebrows | |
| | Short eyebrow | Short eyebrow → Long eyebrow | |
| | Thick eyebrow | Thick eyebrow → Thin eyebrow | |
| | Bushy eyebrow | Bushy eyebrow → Sparse eyebrow | |
| Eye color (7D) | Brown | Brown | |
| | Hazel | Hazel | |
| | Amber | Amber | |
| | Green | Green | |
| | Gray | Gray | |
| | Blue | Blue | |
| | Purple & Red | Purple & Red | |

FIG. 28

| Category | Attributes Names | Descriptions | Example Picture | | |
|---|---|---|---|---|---|
| Nose shapes (11D) | Low nose | Low nose | Low nose | Snub nose | Arrow nose |
| | Snub nose | Snub nose | | | |
| | Arrow nose | Arrow nose | | | |
| | Aquiline nose | Aquiline nose | Aquiline nose | Flare nose | Doggy nose |
| | Flare nose | Flare nose | | | |
| | Doggy nose | Doggy nose | | | |
| | Stair nose | Stair nose | Stair nose | Fist nose | Bent nose |
| | Fist nose | Fist nose | | | |
| | Bent nose | Bent nose | | | |
| | Big nose | Big nose ←→ Small nose | | | |
| | Pointy nose | Pointy nose ←→ Stubby nose | | | |
| Chin / Jaw (5D) | Jutting chin | Jutting chin | Jutting chin | Round chin | Pointed chin |
| | Round chin | Round chin | | | |
| | Pointed chin | Pointed chin | Square Jaw | Double chin | |
| | Square Jaw | Square Jaw | | | |
| | Double chin | Double chin | | | |

FIG. 29

| Category | Attributes Names | Descriptions | Example Picture | | |
|---|---|---|---|---|---|
| Mouth shape (9D) | Chinese Character 'four - 四' | 四 lips | Chinese character 4 四 | | Double moon |
| | Double moon | Double moon lips | | | Cherry |
| | Bow | Bow lips | Bow | | |
| | Cherry | Cherry lips | | | Catfish |
| | Cow | Cow lips | Cow | | |
| | Catfish | Catfish lips | | | Thick upper lip |
| | Carp | Carp lips | Carp | | |
| | Thick upper lip | Thick upper lip | | | |
| | Thick lower lip | Thick lower lip | Thick lower lip | | |
| | Big mouth | Big mouth→Small mouth | | | |
| Etc. (3D) | Bucktooth | Bucktooth | Bucktooth | High cheekbones | Strong Nose-Mouth lines |
| | High cheekbones | High cheekbones | | | |
| | Strong Nose-Mouth lines | Strong Nose-Mouth lines | | | |

FIG. 30

| Category | Descriptions | Descriptions | Example Picture | | |
|---|---|---|---|---|---|
| Hair color (6D) | Black | Black hair |  Black |  Blond |  Brown |
| | Blond | Blond hair | | | |
| | Brown | Brown hair | | | |
| | Gray/White | Gray/White hair | 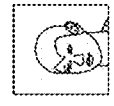 White |  Bald | 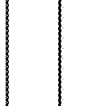 Red |
| | Skin/Bald | Bald | | | |
| | Red | Red hair | | | |
| Hair style (7D) | Curly | Curly hair |  Curly |  Straight |  Wavy |
| | Straight | Straight hair | | | |
| | Wavy | Wavy hair | | | |
| | Bangs | Bangs |  Bangs |  Short | 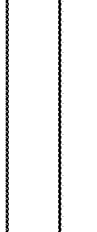 Receding hairline |
| | Short | Short hair (Short cut) | | | |
| | Receding hairline | Frontal baldness | | | |
| | Bald | Bald | | | |
| Face shape (3D) | Oval | Oval face |  Oval | 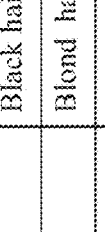 Square | 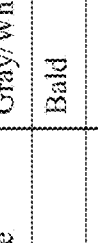 Round |
| | Square | Square face | | | |
| | Round | Round face | | | |
| Fatness (1D) | Chubby | Chubby face | 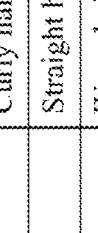 | | |

METHOD AND APPARATUS FOR RECOGNIZING OBJECT, AND METHOD AND APPARATUS FOR TRAINING RECOGNIZER

CROSS-REFERENCE TO RELATED APPLICATION

This application claims the priority benefit of Korean Patent Application No. 10-2014-0164232, filed on Nov. 24, 2014, and Korean Patent Application No. 10-2015-0086658, filed on Jun. 18, 2015, in the Korean Intellectual Property Office, the entire contents of each of which are incorporated herein by reference in its entirety.

BACKGROUND

1. Field

At least some example embodiments relate to a method and apparatus for recognizing an object, and a method and apparatus for training a recognizer.

2. Description of the Related Art

As use of face recognition technology becomes widespread, technology that recognizes a face by applying a principal component analysis (PCA) to a face image is being used. The PCA refers to a technique of reducing information by projecting image data in a low-dimensional eigenvector space while minimizing a loss of intrinsic information of an image. As a face recognition method using the PCA, a method of extracting principal feature vectors of a face, and recognizing the face through a pattern classifier trained using principal component vectors extracted from a pre-registered image is widely used.

SUMMARY

At least some example embodiment are directed to methods and/or apparatuses for training and/or using a recognizer to recognize multiple elements of an input image.

According to at least some example embodiments, a recognition method may include receiving an input image; and recognizing a plurality of elements associated with the input image using a single recognizer pre-trained to recognize a plurality of elements simultaneously. The plurality of elements may include an identity (ID) that identifies the input image; and at least one attribute associated with the input image. The ID may identify at least an object included in the input image. The at least one attribute may include at least one of: a gender corresponding to a face region included in the input image; an age corresponding to the face region; an ethnic group corresponding to the face region; an attractiveness corresponding to the face region; or a facial expression corresponding to the face region. The at least one attribute may include at least two different attributes from among the gender, the age, the ethnic group, the attractiveness, and the facial expression. The recognizer may include a neural network, and the recognizing may include calculating feature values corresponding to the plurality of elements based on pre-learned weights between nodes included in the neural network. The recognizing may include generating a plurality of feature images based on the input image. The plurality of feature images may include at least one of: a color channel image from which illumination noise is removed; an oriented-gradient magnitude channel image; a skin probability channel image; or a local binary pattern channel image. The recognizing may include filtering the plurality of feature images; and outputting feature values corresponding to the plurality of elements based on an output of the filtering module. The recognizing may further include recognizing the plurality of elements based on the feature values. The recognizing may include acquiring a plurality of part images corresponding to parts of a face included in a training image; and generating a plurality of feature images corresponding to each of the plurality of part images. The recognizing may include outputting feature values corresponding to the plurality of elements based on outputs of a plurality of part recognition modules, wherein each of the plurality of part recognition modules includes filtering feature images of a corresponding part image; and outputting feature values corresponding to elements associated with the corresponding part image based on an output of the filtering module. The recognizing may further include recognizing the plurality of elements based on an output of the first element feature output module. The recognition method may further include comparing the plurality of elements to a plurality of elements associated with a reference image; and determining whether the input image matches the reference image based on a result of the comparing. The comparing may include generating a feature vector based on the plurality of elements; and comparing the feature vector to a reference vector of the reference image.

According to at least some example embodiments, a method of training a recognizer may include receiving a training image; and training a recognizer configured to recognize a plurality of elements from an input image, based on the training image and a plurality of elements labeled in the training image.

The plurality of elements may include an identity (ID) that identifies the training image; and at least one attribute associated with the training image. The ID may include information that identifies at least an object included in the training image. The at least one attribute may include at least one of: a gender corresponding to a face region included in the training image; an age corresponding to the face region; an ethnic group corresponding to the face region; an attractiveness corresponding to the face region; or a facial expression corresponding to the face region. The at least one attribute may include at least two different attributes from among the gender, the age, the ethnic group, the attractiveness, and the facial expression. The training may include calculating losses corresponding to the plurality of elements. The recognizer may include a neural network, and the training may include training the recognizer to learn weights between nodes included in the neural network based on the losses. The recognizer may include a neural network, and the training may include activating nodes included in the neural network based on a stochastic piecewise linear (PWL) model. The training may include generating a plurality of feature images based on the training image. The plurality of feature images may include at least one of: a color channel image from which illumination noise is removed; an oriented-gradient magnitude channel image; a skin probability channel image; or a local binary pattern channel image. The training may include training the recognizer to filter the plurality of feature images; and training the recognizer to output feature values corresponding to the plurality of elements based on an output of the filtering of the plurality of feature images. The training may further include training the recognizer to recognize the plurality of elements based on an output of the element feature output module. The training may include acquiring a plurality of part images corresponding to parts of a face included in the training image. Different elements may be labeled in the plurality of part images. The training may further include generating a plurality of feature images corresponding to each of the plurality of part images. The training may include training the recognizer to output feature values corresponding to the plurality of elements based on outputs of a plurality of part recognition modules corresponding to the plurality of part images; and for each of the plurality of part recognition modules, training the part recognition module to filter feature images of a corresponding part image, and training the part recognition module to output feature values corresponding to elements associated with the corresponding part image based on an output of the filtering module. The training may further include training the recognizer to recognize the plurality of elements based on an output of the first element feature output module.

According to at least one example embodiment, a non-transitory computer-readable medium includes program code that, when executed by a processor, causes the processor to perform operations including receiving a training image; and training a recognizer configured to recognize a plurality of elements from an input image, based on the training image and a plurality of elements labeled in the training image According to at least one example embodiment, a recognition apparatus includes a memory storing instructions; and one or more processors configured to execute the instructions such that the one or more processors are configured to, receive an input image; and recognize a plurality of elements associated with the input image using a pre-trained single recognizer.

According to at least one example embodiment, an apparatus for training a recognizer includes a memory storing instructions; and one or more processors configured to execute the instructions such that the one or more processors are configured to, receive a training image; and train a recognizer configured to recognize a plurality of elements from an input image, based on the training image and a plurality of elements labeled in the training image.

According to at least one example embodiment, a method includes receiving a plurality of training images, each of the plurality of images including one or more labeled elements; and training one or more convolutional neural networks (CNNs) such that the trained one or more CNNs recognize at least two different elements from an input image, based on the plurality of training images and the labeled elements included in the plurality of training images.

The training may include training the one or more CNNs to perform the recognition with respect to both an image identification (ID) and at least one image attribute. The at least one attribute may include at least one of: a gender corresponding to a face region included in the input image; an age corresponding to the face region; an ethnic group corresponding to the face region; an attractiveness corresponding to the face region; or a facial expression corresponding to the face region. The training may include generating, for each of the plurality of training images, a plurality of types of channel images, and training the one or more CNNs to perform the recognition based on at least two of the plurality of types of channel images. The at least two types of channel images may include a first type and a second type, the first and second types may be different, and each of the first and second types may be one of: a color type of channel image from which illumination noise is removed, an oriented-gradient magnitude type of channel image; a skin probability type of channel image, or a local binary pattern type of channel image. The one or more CNNs may include a single CNN, and the training may include training the single CNN to perform the recognition based on at least the first and second types. The one or more CNNs may include at least a first CNN and a second CNN, and the training may include, training the first CNN to perform the recognition based on the first type, and training the second CNN to perform the recognition based on the second type. The method may further include fusing an output of the first CNN generated in response to the training of the first CNN with an output of the second CNN generated in response to the training of the second CNN.

According to at least one example embodiment, a method includes receiving an input image; and recognizing, using one or more trained convolutional neural networks (CNNs), at least two different elements from the input image, the one or more trained CNNs each being a CNN trained based on a plurality of training images and labeled elements included in the plurality of training images.

The recognizing may include using the one or more trained CNNs to perform the recognition with respect to both an image identification (ID) and at least one image attribute. The at least one attribute may include at least one of: a gender corresponding to a face region included in the input image; an age corresponding to the face region; an ethnic group corresponding to the face region; an attractiveness corresponding to the face region; or a facial expression corresponding to the face region. The recognizing may include generating, for the input image, a plurality of types of channel images, and using the one or more trained CNNs to perform the recognition based on at least two of the plurality of types of channel images. The at least two types of channel images may include a first type and a second type, the first and second types may be different, and each of the first and second types may be one of: a color type of channel image from which illumination noise is removed, an oriented-gradient magnitude type of channel image; a skin probability type of channel image, or a local binary pattern type of channel image. The one or more CNNs may be a single CNN, and the recognizing may include using the single CNN to perform the recognition based on at least the first and second types. The one or more CNNs may include at least a first CNN and a second CNN, and the recognizing may include using the first CNN to perform a first recognition based on the first type, and using the second CNN to perform a second recognition based on the second type. The method may further include fusing an output of the first CNN generated in response to the first recognition with an output of the second CNN generated in response to the second recognition.

Additional aspects of at least some example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 17 through 24 illustrate face recognition apparatuses according to at least some example embodiments; and FIGS. 25 through 30 illustrate attributes according to at least some example embodiments.

DETAILED DESCRIPTION

Figure 1:
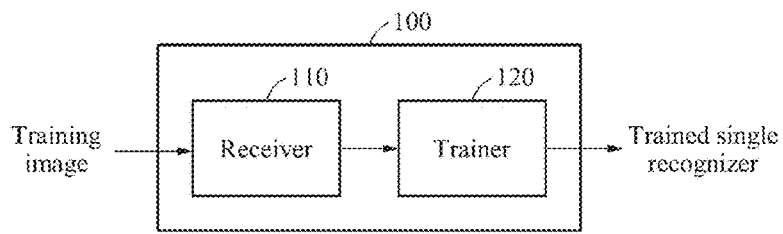
FIG. 1 is a block diagram illustrating a training apparatus according to at least some example embodiments.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Hereinafter, reference will now be made in detail to embodiments, examples of which are illustrated in the accompanying drawings, wherein like reference numerals refer to like elements throughout. At least some following example embodiments may be applied to technology that recognizes an object, for example, a face. For example, at least some example embodiments may be applied to user recognition, user recognition, and search and management of multimedia, for example, photos.

FIG. 1 is a block diagram illustrating a training apparatus according to at least some example embodiments. Referring to FIG. 1, a training apparatus 100 according to at least some example embodiments may include a receiver 110 and a trainer 120. The receiver 110 may receive a training image. The trainer 120 may train a recognizer using the received training image. For example, the training apparatus 100 may train a recognizer configured to recognize a face. The training apparatus 100 may receive the training image including a face, and train the recognizer configured to recognize a face based on the received training image. The receiver 110 and the trainer 120 may be implemented as a software module, a hardware module, or a combination thereof. The training apparatus 100 may be provided in various computing devices and/or systems, for example, smart phones, tablet computers, laptop computers, desktop computers, televisions, wearable devices, security systems, and smart home systems. For example, according to at least one example embodiment of the inventive concepts, the training apparatus 100 may include or be implemented by one or more circuits or circuitry (e.g., hardware) specifically structured to carry out some or all of the operations described herein as being performed by the training apparatus 100 (or an element thereof). According to at least one example embodiment of the inventive concepts, the training apparatus 100 may include or be implemented by a memory and one or more processors executing computer-readable code (e.g., software) that is stored in the memory and includes instructions corresponding to some or all of the operations described herein as being performed by the training apparatus 100 (or an element thereof). According to at least one example embodiment of the inventive concepts, the training apparatus 100 may be implemented by, for example, a combination of the above-referenced hardware and processors executing computer-readable code.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

A plurality of elements may be labeled in the training image. The plurality of elements may include an identity (ID) configured to identify the training image, and attributes associated with the training image. The ID may be information to be used to identify an object included in the training image, for example, information to be used to identify a user included in the training image. The attributes may be information configured to express the object included in the training image, and may include, for example, a gender, an age, an ethnic group, an attractiveness, a facial expression, and an emotion corresponding to a face region of the user included in the training image.

The trainer 120 may train the recognizer to recognize a plurality of elements from the training image, based on the plurality of elements labeled in the training image. Unlike a recognizer trained by general face recognition schemes, the recognizer trained by the trainer 120 may recognize a plurality of elements from an input image. For example, the recognizer trained by general face recognition schemes may recognize only an ID from an input image, whereas the recognizer trained by the trainer 120 may simultaneously recognize an ID, a gender, an age, an ethnicity, an attractiveness, a facial expression, and an emotion from the input image. The recognizer trained by the trainer 120 may be a single recognizer configured to perform multi-task recognition of a plurality of elements.

Figure 2:
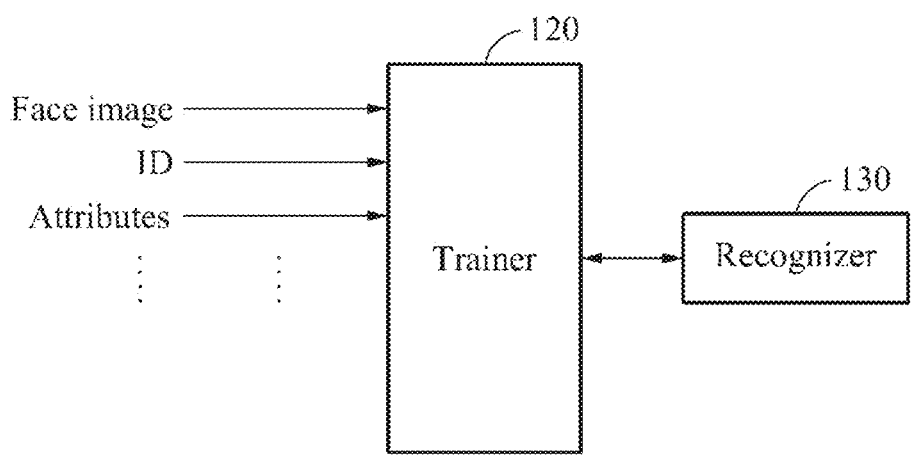
FIG. 2 illustrates multi-task training according to at least some example embodiments.

FIG. 2 illustrates multi-task training according to at least some example embodiments. Referring to FIG. 2, the trainer 120 may train a recognizer 130 to recognize an ID and attributes from a face image. The face image may be an image of a face region extracted from a training image. The trainer 120 may train the recognizer 130 to recognize a plurality of elements simultaneously. Thus, an operation of the trainer 120 of FIG. 2 may be referred to as multi-task training. Like the training apparatus 100, the recognizers and trainers described herein may be implemented by, for example, hardware, processors executing computer-readable code, or a combination of the above-referenced hardware and processors executing computer-readable code. It is possible for a face of an identical user (e.g., two separate views or pictures of the same user's face) to look different under particular circumstances based on, for example, different illuminations, poses, facial expressions, and occlusions between the various views. In this example, different distributions may be formed between features extracted from the different views, even though the different views are both views of the same user's face. Conversely, faces of different users (e.g., two views or pictures of two different users' faces, respectively) may look similar under particular circumstances based on, for example, similar illuminations, poses, facial expressions, and occlusions between the various views. In this example, similar distributions may be formed between features extracted from the different views, even though the different views are views of different users' faces.

A recognizer trained by the trainer 120 may recognize a plurality of elements simultaneously, thereby increasing recognition accuracy. For example, the plurality of elements may include mid-level attributes, for example, eye colors, and nose shapes. The mid-level attributes may be robust against a change in an illumination, a pose, a facial expression, and an occlusion. Thus, the recognizer may increase the recognition accuracy by jointly learning the ID and the mid-level attributes. The recognizer may also increase the recognition accuracy by jointly learning the ID and attributes that precisely distinguish different users, for example, genders and hair styles.

Figure 3:
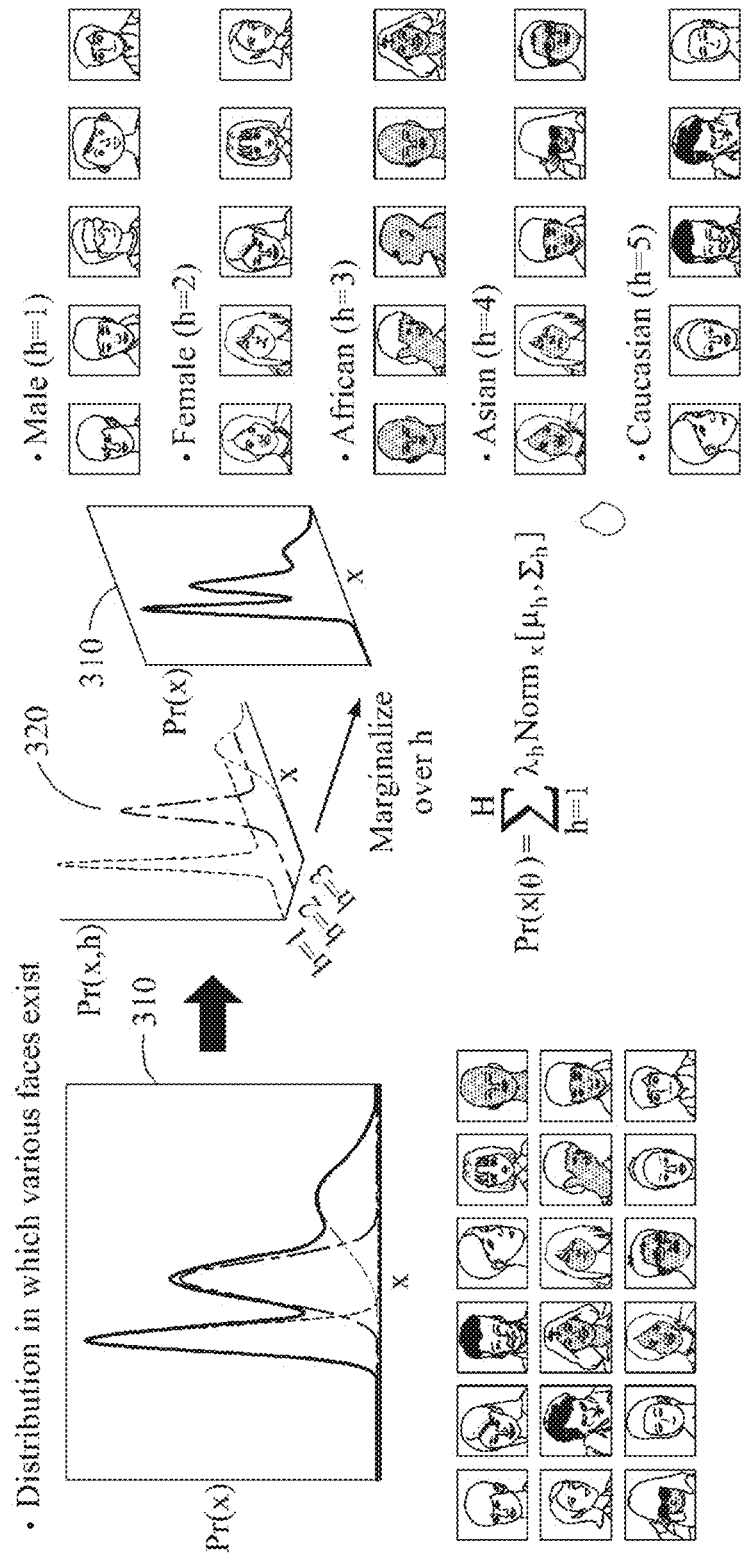
FIG. 3 illustrates a principle of a recognizer increasing recognition accuracy by jointly learning elements according to at least some example embodiments.

FIG. 3 illustrates a principle of a recognizer increasing recognition accuracy by jointly learning elements according to at least some example embodiments. Referring to FIG. 3, a distribution in which various faces exist may be expressed by a mixture 310 of Gaussian models. The mixture 310 of Gaussian models may be classified by mid-level attributes. A distribution of faces corresponding to each of the mid-level attributes may be expressed by a plurality of Gaussian models 320. For example, the mixture 310 of Gaussian models may be classified into a Gaussian model of a case h=1 in which a gender corresponds to a male, a Gaussian model of a case h=2 in which the gender corresponds to a female, a Gaussian model of a case h=3 in which an ethnicity corresponds to an African, a Gaussian model of a case h=4 in which the ethnicity corresponds to an Asian, and a Gaussian model of a case h=5 in which the ethnicity corresponds to a Caucasian.

The mid-level attributes may be more robust than low-level features, for example, pixel values. Thus, by performing intensive learning with respect to each mid-level attribute, the recognition accuracy may increase.

Figure 4:
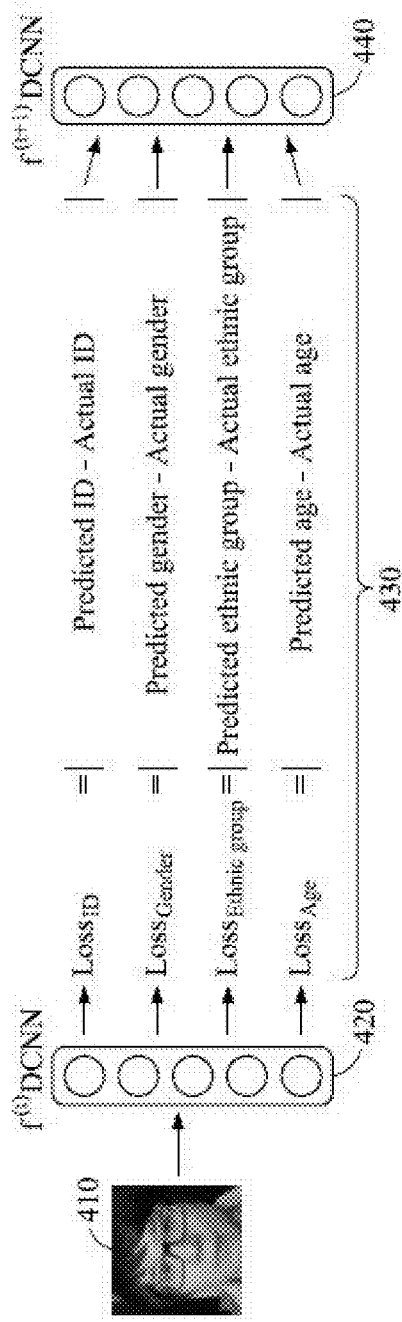
FIG. 4 illustrates a principle of multi-task training according to at least some example embodiments.

FIG. 4 illustrates a principle of multi-task training according to at least some example embodiments. Referring to FIG. 4, the trainer 120 may input a face image 410 into a recognizer 420 trained up to date. For example, the trainer 120 may extract feature vectors from the face image 410, and input the extracted feature vectors into the recognizer 420.

The recognizer 420 may generate output values corresponding to a plurality of elements based on input values. The recognizer 420 may include an artificial neural network, for example, a deep convolutional neural network (DCNN). The DCNN will be described in detail later with reference to FIG. 5.

The artificial neural network may include an input layer, a hidden layer, and an output layer. Each layer may include a plurality of nodes, and nodes between adjacent layers may be connected to each other based on connection weights. Each node may operate based on an activation model. An output value corresponding to an input value may be determined based on the activation model. An output value of a predetermined or, alternatively, desired node may be input into a node of a subsequent layer connected to the corresponding node. The node of the subsequent layer may receive values output from a plurality of nodes. In a process of inputting an output value of a predetermined or, alternatively, desired node into a node of a subsequent layer, a connection weight may be applied. The node of the subsequent layer may output an output value corresponding to an input value to a node of a layer following the subsequent layer connected to the corresponding node based on the activation model.

The output layer may include nodes corresponding to a plurality of elements. The nodes of the output layer may output feature values corresponding to the plurality of elements. As will be described in the following, feature values output from the artificial neural network may be converted into elements through linear classifiers for the plurality of elements. The trainer 120 may be aware of actual elements labeled in the face image 410. Thus, the trainer 120 may calculate losses 430 between the actual elements and elements predicted through the recognizer 420.

The trainer 120 may update the recognizer 420 to reduce the losses 430 using a backward propagation. For example, the trainer 120 may propagate the losses 430 in a backward direction from the output layer through the hidden layer toward the input layer of the artificial neural network in the recognizer 420. While the losses 430 are propagated in the backward direction, the connection weights between the nodes may be updated to reduce the losses 430. As described above, the trainer 120 may train the recognizer 420 in view of the losses 430 corresponding to the plurality of elements. An updated recognizer 440 may be used for a subsequent training epoch, and the multi-task training operation described above may be performed iteratively until the losses 430 are less than a predetermined or, alternatively, desired threshold value.

Figure 5:
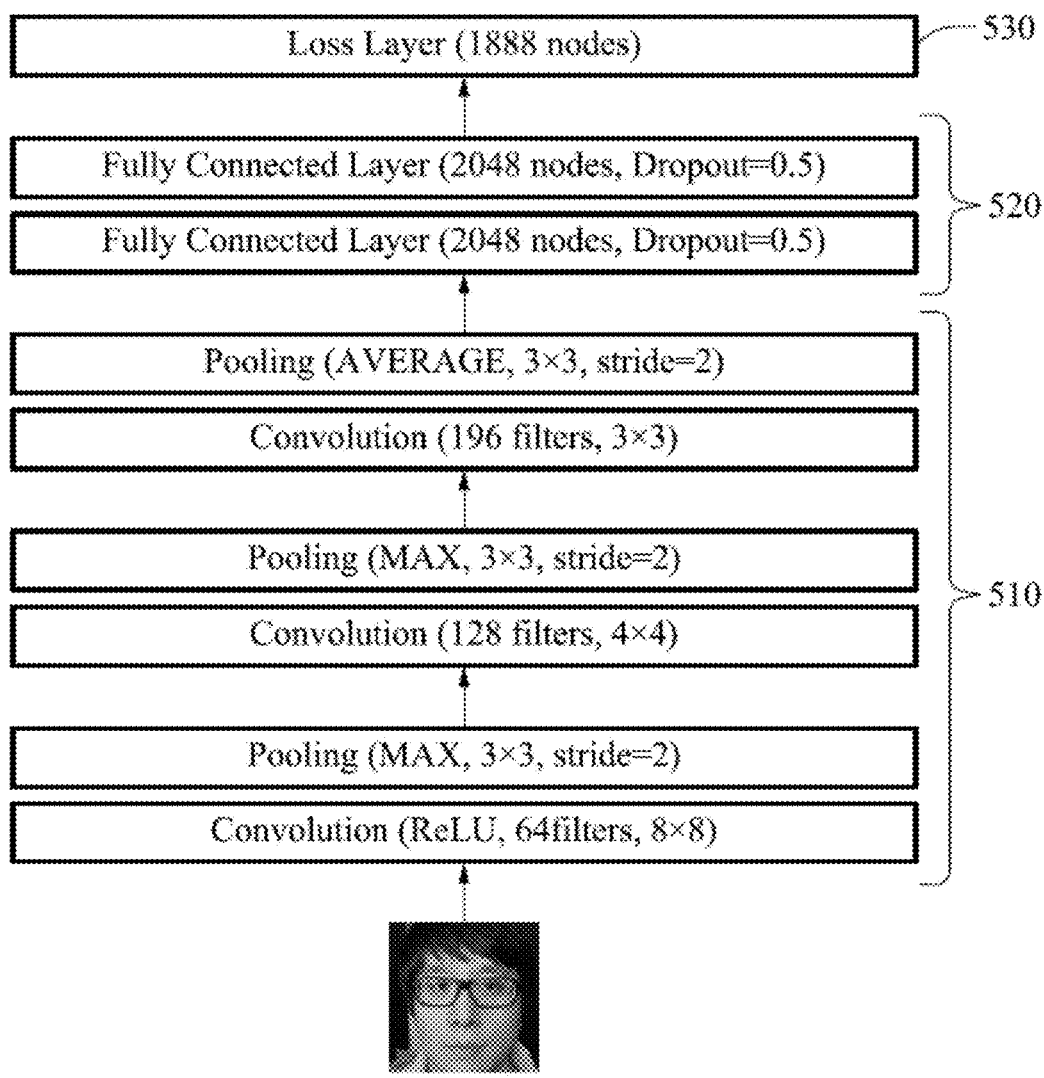
FIG. 5 illustrates an example of a deep convolutional neural network (DCNN) according to at least some example embodiments.

FIG. 5 illustrates an example of a DCNN according to at least some example embodiments. Referring to FIG. 5, a DCNN according to at least some example embodiments may include convolution layers 510, fully connected layers 520, and a loss layer 530. The convolution layers 510 may correspond to a filtering module of a recognizer, the filtering module configured to filter an input image. The convolution layers 510 may include a convolution filtering layer, a pooling layer, or a combination thereof. For example, the convolution layers 510 may include a first convolution filtering layer, a first pooling layer, a second convolution filtering layer, a second pooling layer, a third convolution filtering layer, and a third pooling layer.

In the first convolution filtering layer, convolution filtering may be performed using 64 filters of an 8×8 size. Each of the 64 filters may filter a predetermined or, alternatively, desired edge. As a result of the convolution filtering, 64 filtering images corresponding to the filters may be generated. The first convolution filtering layer may include nodes included in the 64 filtering images. Each node included in the first convolution filtering layer may receive a value filtered from an 8×8 sized area of the input image. A rectifier linear unit (ReLU) may be used as an activation model of each node included in the first convolution filtering layer. The ReLU may output "0" with respect to an input below "0", and output a linearly proportional value with respect to an input exceeding "0".

In the first pooling layer, representative values may be extracted from the 64 filtering images through pooling. For example, in the first pooling layer, a maximum value within a 3×3 sized window may be extracted while sliding the window by two columns with respect to each filtering image. As a result of the pooling, 64 pooling images corresponding to the filtering images may be generated. The first pooling layer may include nodes included in the 64 pooling images. Each node included in the first pooling layer may receive a value pooled from a 3×3 sized area of a corresponding filtering image. As described above, most fundamental features of the input image may be extracted from the first convolution filtering layer and the first pooling layer.

In the second convolution filtering layer, convolution filtering may be performed using 128 filters of a 4×4 size. Each of the 128 filters may filter a predetermined or, alternatively, desired edge. The filters of the second convolution filtering layer may filter relatively complex edges, when compared to the filters of the first convolution filtering layer. As a result of the convolution filtering, 128 filtering images may be generated from a pooling image. The second convolution filtering layer may include nodes included in the 128 filtering images. Each node included in the second convolution filtering layer may receive a value filtered from a 4×4 sized area of a corresponding pooling image.

In the second pooling layer, representative values may be extracted from the 128 filtering images through pooling. For example, in the second pooling layer, a maximum value within a 3×3 sized window may be extracted while sliding the window by two columns with respect to each filtering image. As a result of the pooling, 128 pooling images corresponding to the filtering images may be generated. The second pooling layer may include nodes included in the 128 pooling images. Each node included in the second pooling layer may receive a value pooled from a 3×3 sized area of a corresponding filtering image. As described above, mid-complexity features of the input image may be extracted from the second convolution filtering layer and the second pooling layer.

In the third convolution filtering layer, convolution filtering may be performed using 196 filters of 3×3 size. Each of the 196 filters may filter a predetermined or, alternatively, desired edge. The filters of the third convolution filtering layer may filter relatively complex edges, when compared to the filters of the second convolution filtering layer. As a result of the convolution filtering, 196 filtering images, may be generated from a pooling image. The third convolution filtering layer may include nodes included in the 196 filtering images. Each node included in the third convolution filtering layer may receive a value filtered from a 3×3 sized area of a corresponding pooling image.

In the third pooling layer, representative values may be extracted from the 196 filtering images through pooling. For example, in the third pooling layer, an average value within a 3×3 sized window may be extracted while sliding the window by two columns with respect to each filtering image. As a result of the pooling, 196 pooling images corresponding to the filtering images may be generated. The third pooling layer may include nodes included in the 196 pooling images. Each node included in the third pooling layer may receive a value pooled from a 3×3 sized area of a corresponding filtering image. As described above, complex features of the input image may be extracted from the third convolution filtering layer and the third pooling layer.

In the convolution layers 510, nodes between adjacent layers may be partially connected, and connection weights may be shared therebetween. Conversely, in the fully connected layers 520, nodes between adjacent layers may be fully connected, and connection weights may be individually set. The fully connected layers 520 may correspond to an element feature output module of the recognizer, the element feature output module configured to output feature values corresponding to a plurality of elements based on an output of the filtering module of the recognizer.

The fully connected layers 520 may include a plurality of layers, and each layer may include 2,048 nodes. Further, a dropout, a model regularization algorithm, may be applied to the fully connected layers 520. The dropout may refer to an algorithm for randomly dropping a predetermined or, alternatively, desired proportion of nodes, for example, 50% of nodes, from a current training epoch.

The loss layer 530 may calculate losses corresponding to the plurality of elements. The loss layer 530 may correspond to a linear classification module of the recognizer, the linear classification module configured to recognize a plurality of elements based on an output of the element feature output module of the recognizer. The loss layer 530 may include a plurality of linear classifiers corresponding to the plurality of elements. The loss layer 530 may predict the plurality of elements from outputs of the fully connected layers 520 using the linear classifiers, and calculate the losses by comparing the predicted elements to actual elements.

The losses may be backward propagated to the fully connected layers 520 and the convolution layers 510 using a backward propagation. Based on the backward propagated losses, connection weights within the convolution layers 510 and the fully connected layers 520 may be updated. The configurations of the layers, the numbers of the nodes, the sizes of the filters, the activation model, and the related algorithm described with reference to FIG. 5 are provided as examples only for better understanding. Various modifications may be made thereto depending on types of data and purposes of implementation.

Figure 6:
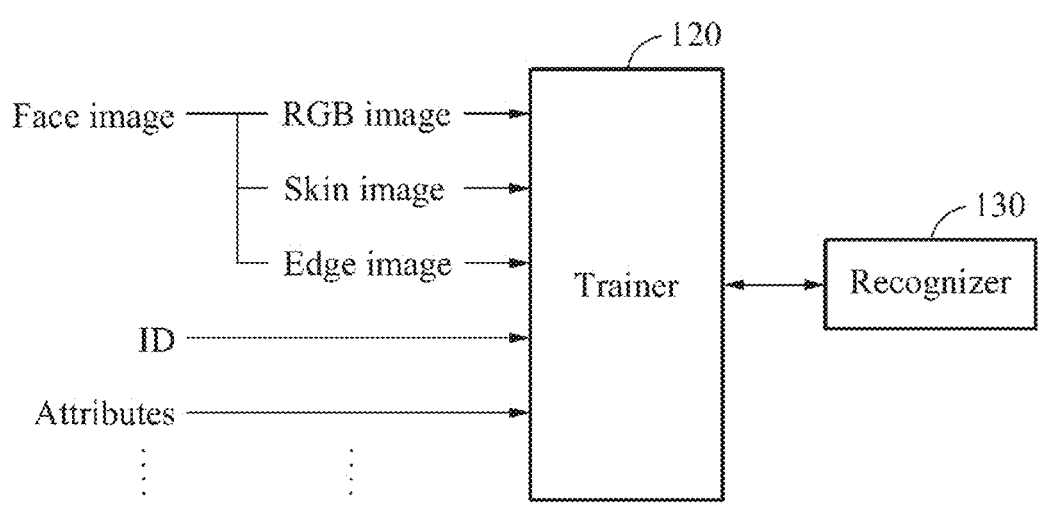
FIG. 6 illustrates multi-channel training according to at least some example embodiments.

FIG. 6 illustrates multi-channel training according to at least some example embodiments. Referring to FIG. 6, the trainer 120 may generate feature images from a face image. The face image may be an image of a face region extracted from a training image. The feature images may be images expressing individual features of the face image, for example, a red, green, and blue (RGB) image associated with a color, a skin image associated with a skin probability, and an edge image associated with an outline. The trainer 120 may generate the RGB image by removing noise, for example, an illumination component affecting a color, from the face image. The trainer 120 may generate the skin image by calculating a probability of pixels included in the face image corresponding to a skin. The trainer 120 may generate the skin image using known algorithms. For example, the trainer 120 may use a deterministic method for generating the skin image. A deterministic method may detect a skin color by extracting pixels using a predetermined skin color range with respect to each pixel value from each channel of an input image. As another example, the trainer 120 may use a probabilistic method for generating the skin image. A probabilistic method may generate a probabilistic skin model based on a skin exclusive probability. The probabilistic skin model is trained online so as to separate components of a face and extract a shape context from the separated components. The feature is extracted based on angles between points to form the shape context. According to at least some example embodiments, the feature extraction capability of the trainer 120 to extract features when using the probabilistic skin model is strong even against a rotation, a scaling, and a translation.

The trainer 120 may generate the edge image by calculating an oriented-gradient magnitude in the face image.

According to at least some example embodiments, in addition to, or in place of, the RGB image, the trainer 120 may generate other types of color channel images including, for example, YUV, YCbCr, and HSV.

The trainer 120 may train the recognizer 130 to recognize an ID and attributes from the feature images. The trainer 120 may train the recognizer 130 using a plurality of feature images. Thus, an operation of the trainer 120 of FIG. 6 may be referred to as multi-channel training. Further, the trainer 120 may train the recognizer 130 to recognize a plurality of elements simultaneously. Thus, the operation of the trainer 120 of FIG. 6 may also correspond to multi-task training.

Figure 7:
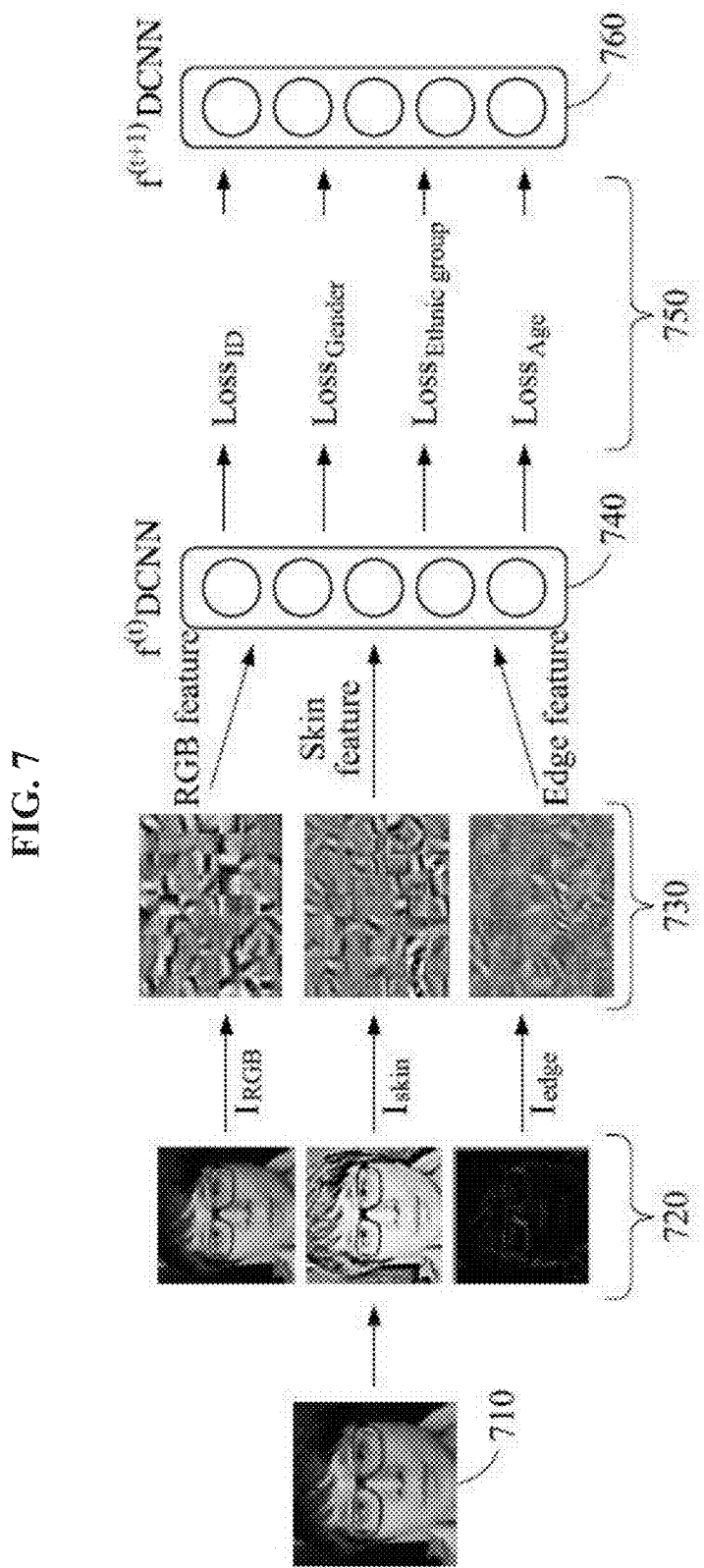
FIG. 7 illustrates a principle of multi-channel training according to at least some example embodiments.

FIG. 7 illustrates a principle of multi-channel training according to at least some example embodiments. Referring to FIG. 7, the trainer 120 may generate a plurality of feature images 720 from a face image 710. The trainer 120 may extract features 730 for each image from the plurality of feature images 720. The trainer 120 may input the features 730 for each image into a recognizer 740 trained up to date.

The recognizer 740 may predict a plurality of elements based on input values. The recognizer 740 may include a DCNN. The DCNN may predict the plurality of elements using convolution layers, fully connected layers, and a loss layer. The trainer 120 may be aware of actual elements labeled in the face image 710. Thus, the trainer 120 may calculate losses 750 between the elements predicted through the recognizer 740 and the actual elements.

The trainer 120 may update the recognizer 740 to reduce the losses 750 using a backward propagation. For example, the trainer 120 may update connection weights between nodes in the DCNN to reduce the losses 750 while the losses 750 are propagated in a backward direction. As described above, the trainer 120 may train the recognizer 740 in view of the losses 750 corresponding to the plurality of elements. An updated recognizer 760 may be used for a subsequent training epoch, and the multi-channel training operation described above may be performed iteratively until the losses 750 are less than a predetermined or, alternatively, desired threshold value.

Figure 8:
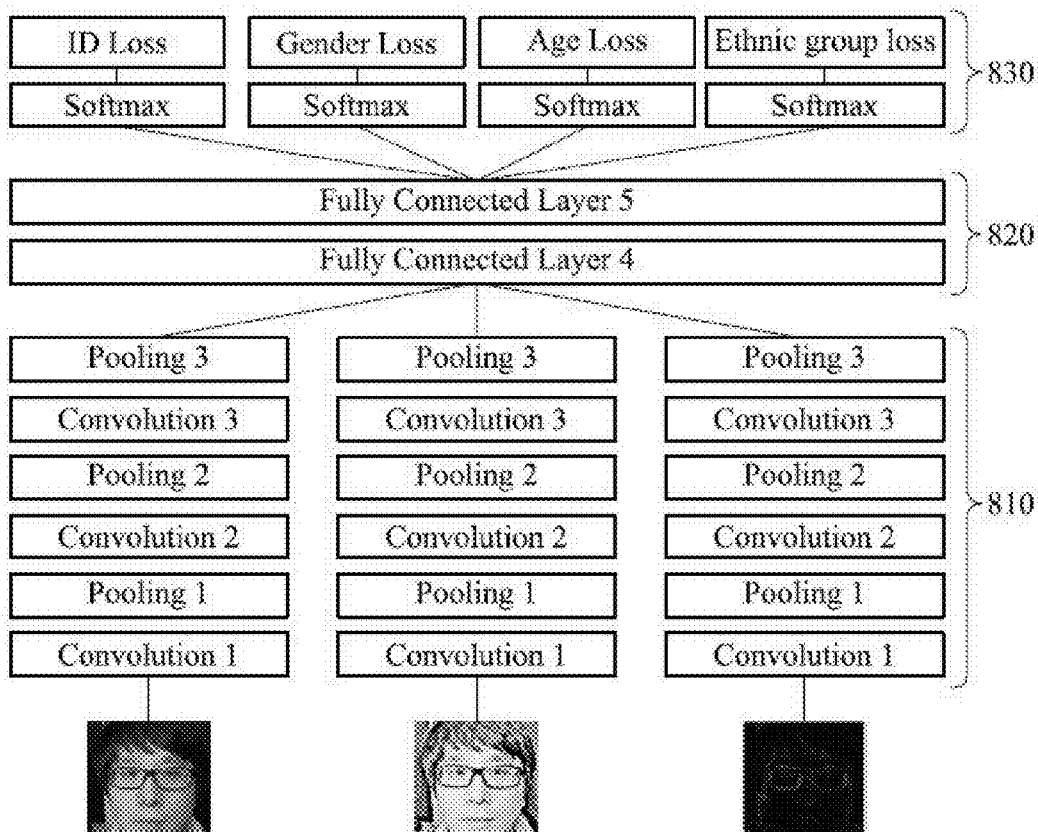
FIGS. 8 and 9 illustrate DCNNs for multi-channel training according to at least some example embodiments.

FIG. 8 illustrates a DCNN for multi-channel training according to at least some example embodiments. Referring to FIG. 8, a DCNN according to at least some example embodiments may learn multiple channels as a single unified framework. For example, feature images of each channel may be learned individually in convolution layers 810, and may be jointly connected and learned in fully connected layers 820. Through the foregoing, convolution filters for channels having different features may be separately learned in the convolution layers 810, and separately learned features may be jointly connected and learned in the fully connected layers 820 in which a manifold feature space is sufficiently unfolded.

A structure of FIG. 8 is provided as an example only. A point in time at which a plurality of channels is connected to each other may be variable, rather than being limited, depending on the structure of the DCNN and purposes of recognition.

Figure 9:
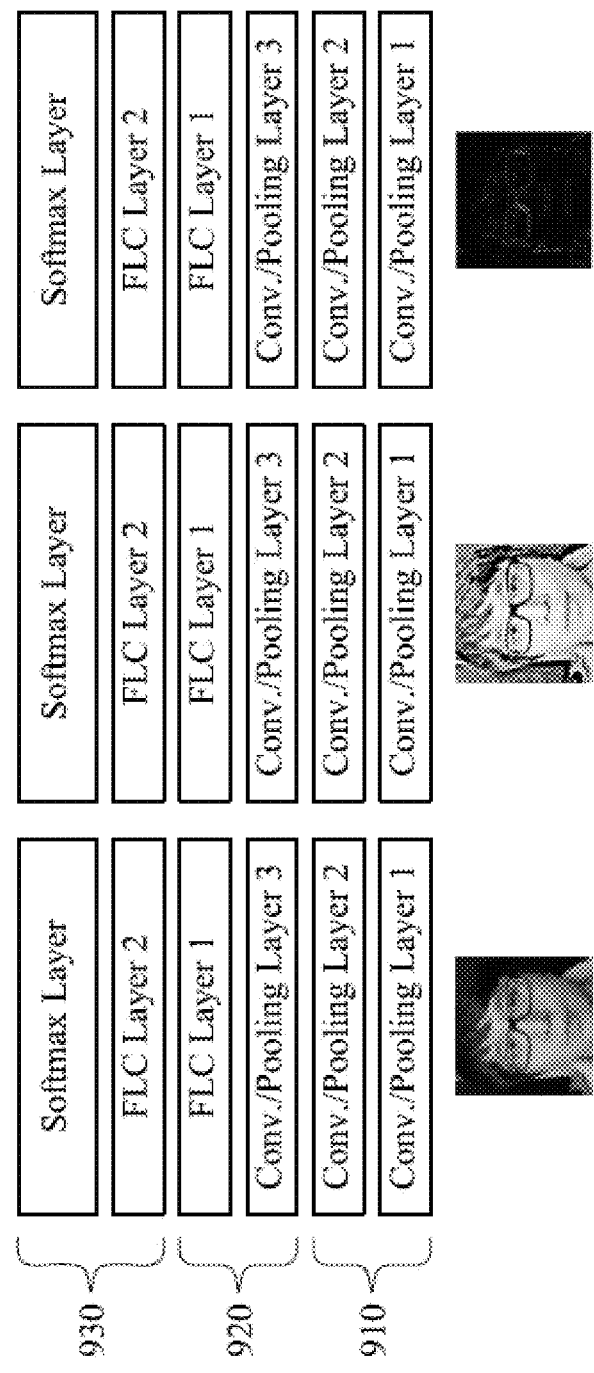

For example, referring to FIG. 9, multiple channels may be learned in multiple individual DCNNs, respectively, and a late fusion may be performed by Equation 1.

$$P(y=k|x) = \frac{1}{M}\sum_{m}^{M=3} \frac{e^{x^T w_k}}{\sum_{k}^{K=1888} e^{x^T w_k}}$$ [Equation 1]

In Equation 1, M denotes a number of DCNNs, K denotes a number of output nodes corresponding to a number of classes of each DCNN, x denotes input data, $x^T$ denotes data in which the input data x is transposed, and y denotes output data. P(y=k|x) denotes a probability that the output data y is k when the input data x is input. Further, m denotes an index of an individual DCNN, k denotes a class of a corresponding DCNN and wk denotes a weight for a $k^{th}$ class of DCNN trained so far.

Figure 10:
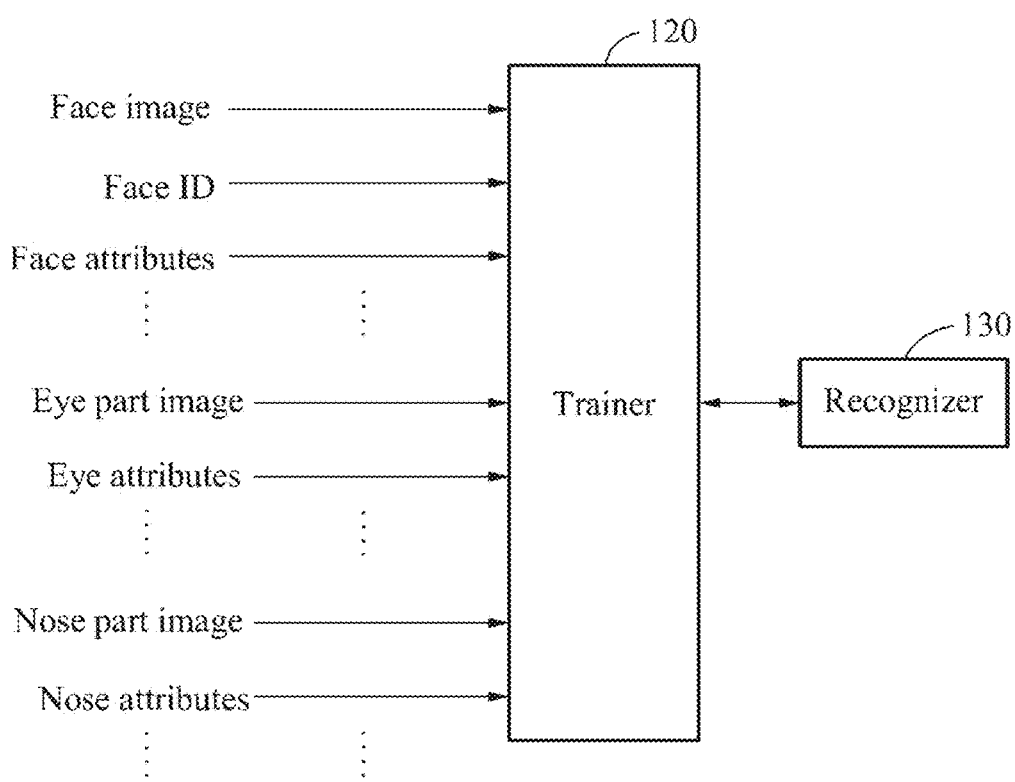
FIG. 10 illustrates multi-part training according to at least some example embodiments.

FIG. 10 illustrates multi-part training according to at least some example embodiments. Referring to FIG. 10, the trainer 120 may extract a plurality of part images from a face image. The face image may be an image of a face region extracted from a training image. The part images may be images expressing individual constituent elements within the face image, and may include, for example, an eye part image, a nose part image, and a mouth part image.

The trainer 120 may train the recognizer 130 to recognize a face ID, face attributes, and attributes of each part image from the face image and the part images. The face ID may be information used to identify a user. The face attributes may differ from the attributes of each part image. For example, the face attributes may include a gender, an age, an ethnic group, an attractiveness, and a facial expression. An eye attribute may include an eye shape, an eyebrow shape, and an eye color. A nose attribute may include a nose shape, a chin/jaw attribute may include a chin/jaw shape, and a mouth attribute may include a mouth shape. A hair attribute may include a hair color and a hair style.

The face attributes and the attributes of each part image may be labeled together in the training image.

The trainer 120 may train the recognizer 130 using the plurality of part images. Thus, an operation of the trainer 120 of FIG. 10 may be referred to as multi-part training. Further, the trainer 120 may train the recognizer 130 to recognize a plurality of elements simultaneously. Thus, the operation of the trainer 120 of FIG. 10 may also correspond to multi-task training. The multi-part training corresponds to a channel augmentation using part images and thus, may also be broadly regarded as multi-channel training.

Figure 11:
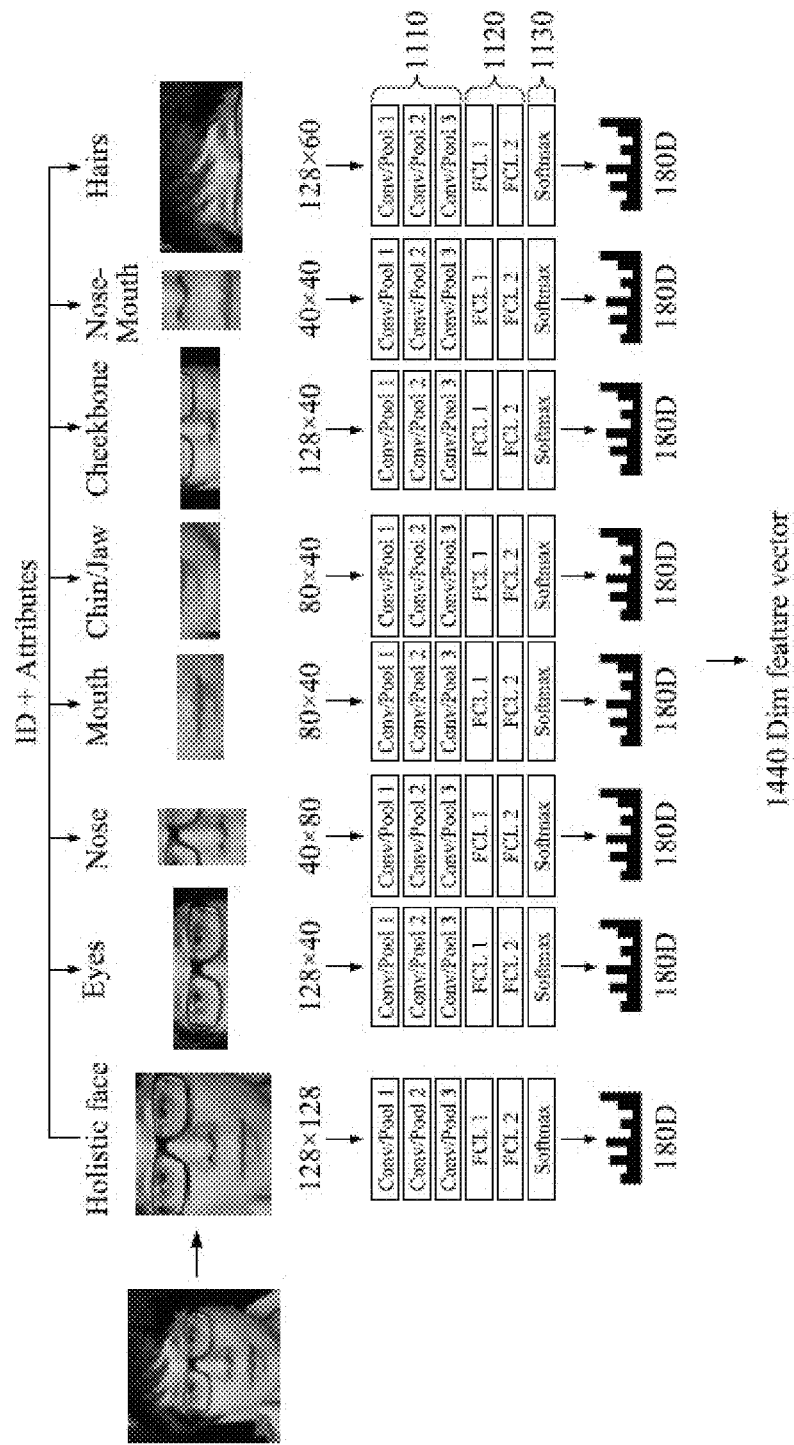
FIG. 11 illustrates a DCNN for multi-part training according to at least some example embodiments.

FIG. 11 illustrates a DCNN for multi-part training according to at least some example embodiments. Referring to FIG. 11, multiple parts may be learned by multiple individual DCNNs, respectively. A late fusion may be performed on outputs of the multiple parts by Equation 1. When features of 180 dimensions are generated in each individual DCNN, features of 1,440 dimensions corresponding to a combination thereof may be used for recognition.

Figure 12:
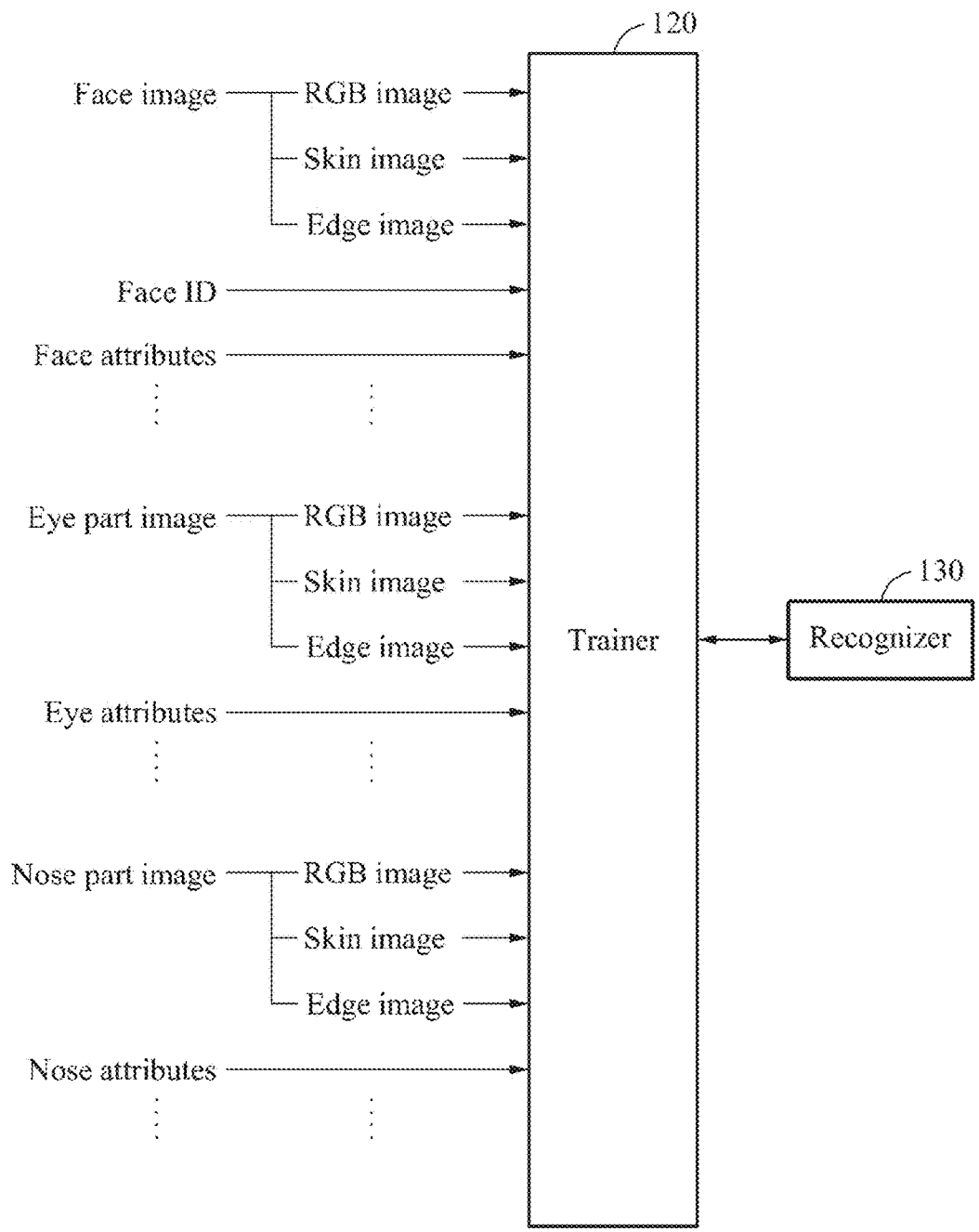
FIG. 12 illustrates a combination of multi-part training and multi-channel training according to at least some example embodiments.

FIG. 12 illustrates a combination of multi-part training and multi-channel training according to at least some example embodiments. Referring to FIG. 12, the trainer 120 may extract a plurality of part images from a face image. The trainer 120 may generate feature images from each of the part images and the face image. The trainer 120 may train the recognizer 130 to recognize a face ID, face attributes, and attributes of each part image from the feature images generated from each of the part images and the face image. The trainer 120 may provide technology that recognizes a face ID only using a part, for example, an eye or a nose, by training a recognizer using a number of parts.

Figure 13:
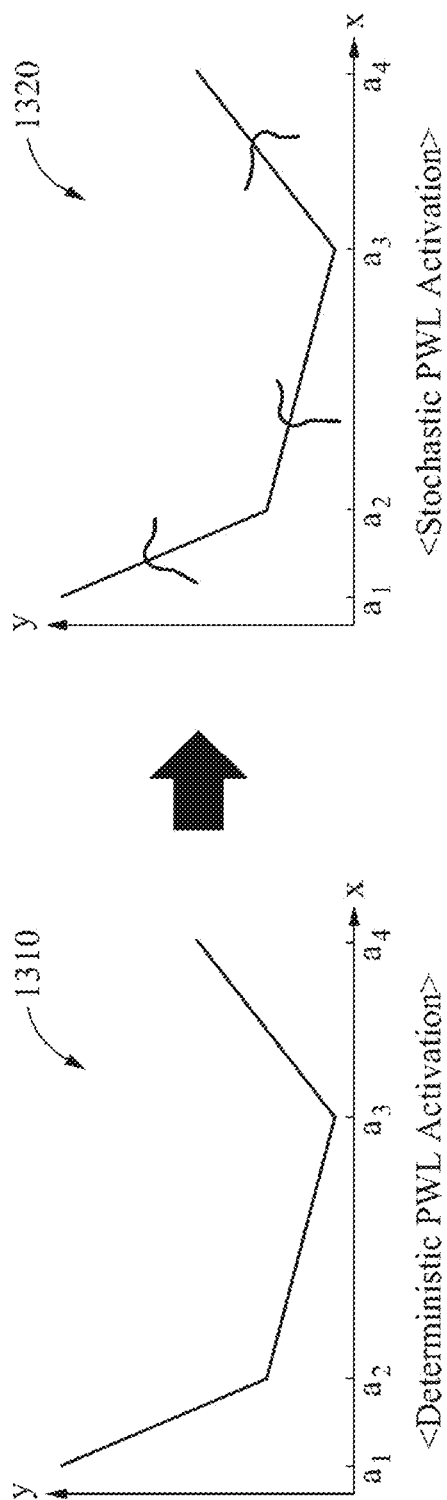
FIG. 13 illustrates a comparison between a stochastic piecewise linear (PWL) activation model and a general deterministic PWL activation model according to at least some example embodiments.

In an example, the trainer 120 may train the recognizer 130 in more various environments by stochastically controlling an active model of nodes included in each layer of a DCNN. An activation model of a node may refer to a model that determines a value output from the node based on values input into the node. The trainer 120 may use a stochastic piecewise linear (PWL) activation model to stochastically control the activation model of the nodes in the DCNN. FIG. 13 illustrates a comparison between a stochastic PWL activation model and a general deterministic PWL activation model according to at least some example embodiments.

Referring to FIG. 13, a general deterministic PWL activation model 1310 may be expressed by Equation 2. In the deterministic PWL activation model 1310, an x axis denotes an input value, and a y axis denotes an output value. Output values with respect to distinguished regions of the x axis may be expressed using different linear functions.

$$h_i(x) = \max_{j \in [1,k]} z_{ij}$$ [Equation 2]

Where, $$z_{ij} = x^T W_{\ldots ij} + b_{ij}$$

In Equation 2, $h_i(x)$ denotes an output function in an $i^{th}$ region, k denotes an index of an individual DCNN, and $W_{\ldots ij}$ and $b_{ij}$ are parameters for a piecewise linear function $z_{ij}$. Here, $W_{\ldots ij}$ denotes a trained weight of a $j^{th}$ piecewise linear function of an $i^{th}$ neuron and $b_{ij}$ denotes a bias term.

A stochastic PWL activation model 1320 according to at least some example embodiments may be expressed by Equation 3. In the stochastic PWL activation model 1320, an x axis denotes an input value, and a y axis denotes an output value.

$$h_i(x) = \max_{j \in [1,k]} z_{ij}$$ [Equation 3]

Where, $$z_{ij} = x^T W'_{\ldots ij} + b_{ij}$$

$$W'_{\ldots ij} = W_{\ldots ij} + N(0, \sigma(x))$$

In Equation 3, $N(0, \sigma(x))$ denotes probability noise and $\sigma(x)$ denotes a standard deviation of x. $W_{\ldots ij}$ denotes a trained weight of a $j^{th}$ piecewise linear function of an $i^{th}$ neuron and $b_{ij}$ denotes a bias term.

Unlike the deterministic PWL activation model 1310, the stochastic PWL activation model 1320 may add stochastic noise N to a PWL function. Due to the stochastic noise N, the recognizer 130 may be trained in more various environments in a case in which the stochastic PWL activation model 1320 is used, when compared to a case in which the deterministic PWL activation model 1310 is used. Accordingly, a performance of the recognizer 130 recognizing new data may increase in a future recognition operation.

Figure 14:
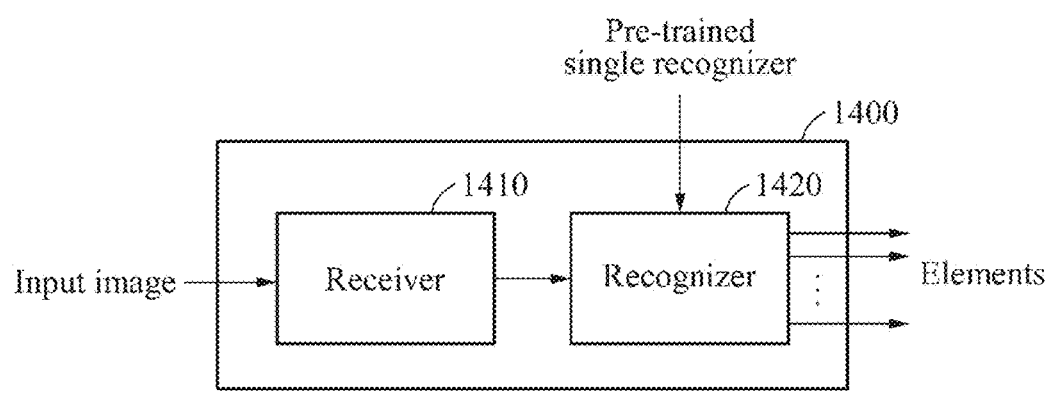
FIG. 14 is a block diagram illustrating a recognition apparatus according to at least some example embodiments.

FIG. 14 is a block diagram illustrating a recognition apparatus according to at least some example embodiments. Referring to FIG. 14, a recognition apparatus 1400 according to at least some example embodiments may include a receiver 1410 and a recognizer 1420. The receiver 1410 may receive an input image. Unlike a training image, the input image may not include labeled information. The recognizer 1420 may recognize a plurality of elements associated with the received input image using a pre-trained recognizer. The pre-trained recognizer may correspond to a recognizer trained by the training apparatus 100 of FIG. 1.

The recognition apparatus 1400 may be an apparatus for recognizing a face. For example, the recognition apparatus 1400 may receive an input image including a face, and recognize a face ID and face attributes from the received input image using the pre-trained recognizer.

Like the training apparatus 100, the recognition apparatus (or elements thereof) described herein may be implemented by, for example, hardware, processors executing computer-readable code, or a combination of the above-referenced hardware and processors executing computer-readable code. For example, the receiver 1410 and the recognizer 1420 may be implemented as a software module, a hardware module, or a combination thereof. The recognition apparatus 1400 may be provided in various computing devices and/or systems, for example, smart phones, tablet computers, laptop computers, desktop computers, televisions, wearable devices, security systems, and smart home systems.

Figure 15A:
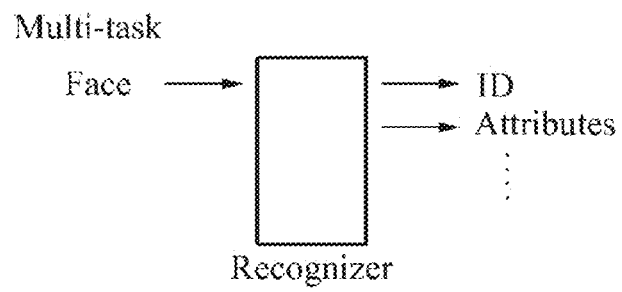
FIGS. 15A through 15D illustrate operations of a recognizer according to at least some example embodiments.

FIGS. 15A through 15D illustrate operations of a recognizer according to at least some example embodiments. Referring to FIG. 15A, the recognizer 1420 may recognize an ID and attributes from a face image. The face image may be an image of a face region extracted from an input image. The recognizer 1420 may be a recognizer trained by multi-task training described with reference to FIG. 2.

Figure 15B:
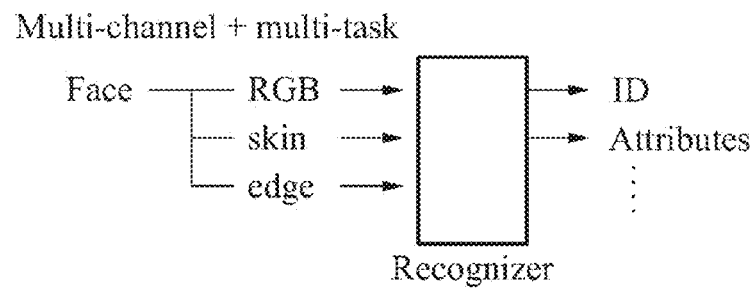

Referring to FIG. 15B, the recognizer 1420 may generate a plurality of feature images from a face image. For example, the recognizer 1420 may generate an RGB image, a skin image, and an edge image from the face image. The recognizer 1420 may recognize an ID and attributes from the plurality of feature images. The recognizer 1420 may be a recognizer trained by multi-channel training described with reference to FIG. 6.

Figure 15C:
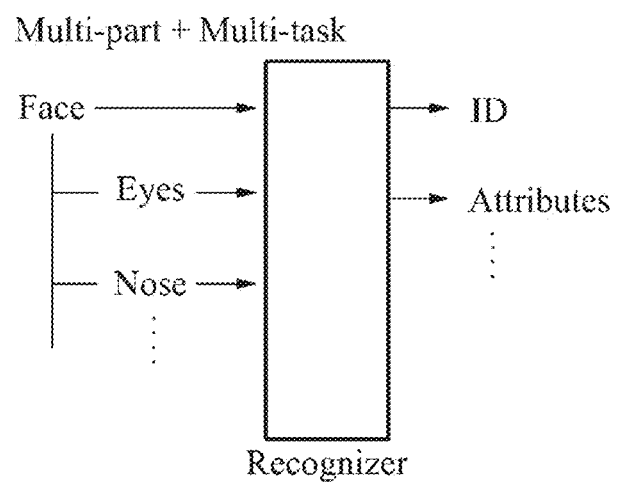

Referring to FIG. 15C, the recognizer 1420 may extract a plurality of part images from a face image. For example, the recognizer 1420 may extract an eye part image, a nose part image, and a mouth part image from the face image. The recognizer 1420 may recognize an ID and attributes from the face image and the plurality of part images. In some cases, the recognizer 1420 may further recognize an ID and attributes of a part image. The recognizer 1420 may be a recognizer trained by multi-part training described with reference to FIG. 10.

Figure 15D:
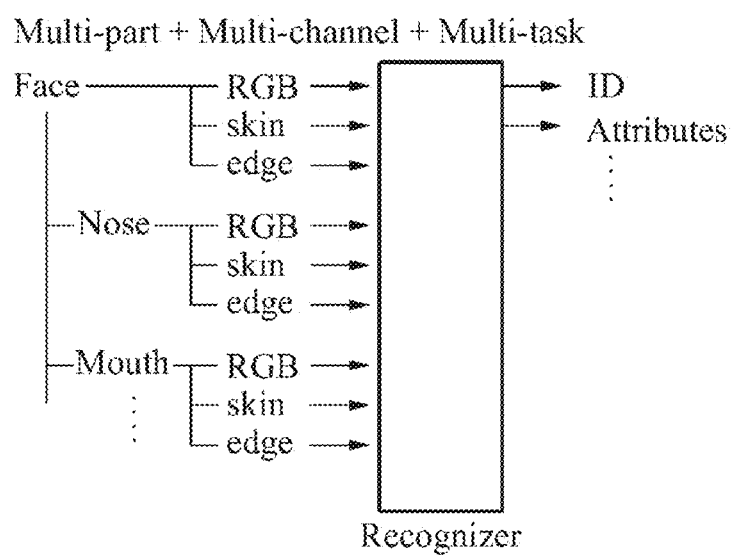

Referring to FIG. 15D, the recognizer 1420 may extract a plurality of part images from a face image. The recognizer 1420 may generate feature images from each of the part images and the face image. The recognizer 1420 may recognize an ID and attributes from the feature images generated from each of the part images and the face image. In some cases, the recognizer 1420 may further recognize an ID and attributes of a part image. The recognizer 1420 may be a recognizer trained by a combination of multi-part training and multi-channel training described with reference to FIG. 12.

Figure 16:
FIG. 16 illustrates a user interface (UI) according to at least some example embodiments.

FIG. 16 illustrates a user interface (UI) according to at least some example embodiments. Referring to FIG. 16, the recognition apparatus 1400 may extract a face region from an input image 1610. The recognition apparatus 1400 may recognize a plurality of elements from the face region 1620 using a pre-trained recognizer. A UI 1630 may display the recognized plurality of elements. For example, the plurality of elements may include an age, an ethnicity, an attractiveness, a face expression, and an emotion. The UI 1630 may display candidate values for each element, and respective recognition reliabilities of the candidate values. The UI 1630 may display a candidate value with a highest recognition reliability to be emphasized, with respect to each element. The UI 1630 of FIG. 16 is provided as an example only, and various modifications may be made to the UI 1630.

Figure 17:
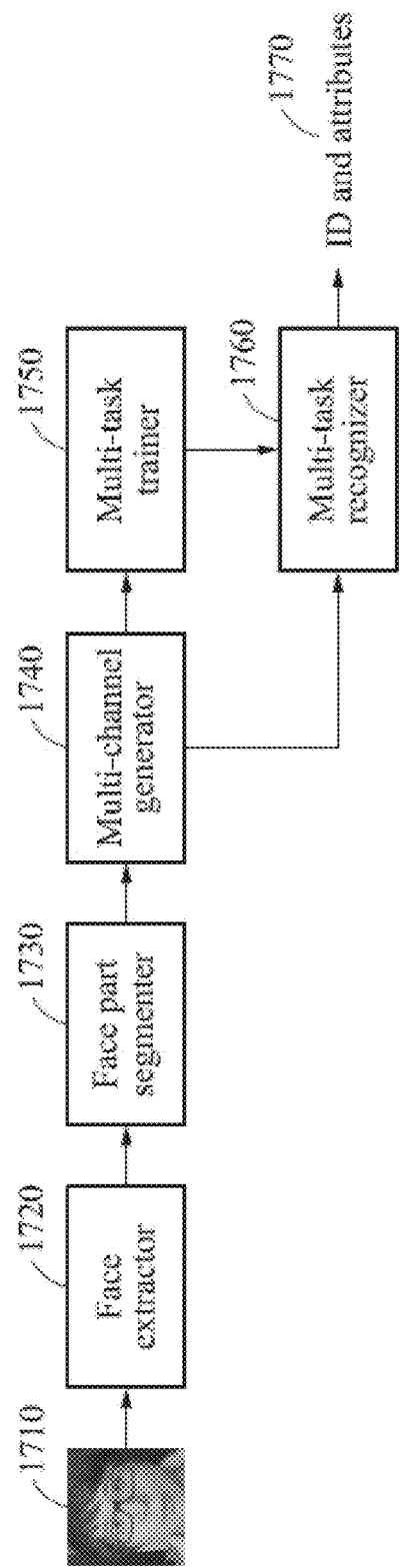

FIGS. 17 through 24 illustrate face recognition apparatuses according to at least some example embodiments. Referring to FIG. 17, a face recognition apparatus according to at least some example embodiments may perform multi-task recognition of an ID and physiognomic attributes 1770. The face recognition apparatus may include a face extractor 1720, a face part segmenter 1730, a multi-channel generator 1740, and a multi-task recognizer 1760. The face extractor 1720 may extract a face image from an input image 1710. The face part segmenter 1730 may segment the face image into a number of part images. The multi-channel generator 1740 may augment each part image to be a multi-channel image. The multi-task recognizer 1760 may perform multi-task recognition of the ID and physiognomic attributes 1770 from the multi-channel image using a multi-trained recognizer.

The face recognition apparatus may further include a multi-task trainer 1750 for multi-task training for the ID and physiognomic attributes 1770. The multi-task trainer 1750 may train a recognizer to perform multi-task recognition of the ID and physiognomic attributes 1770 from the multi-channel image.

Figure 18:
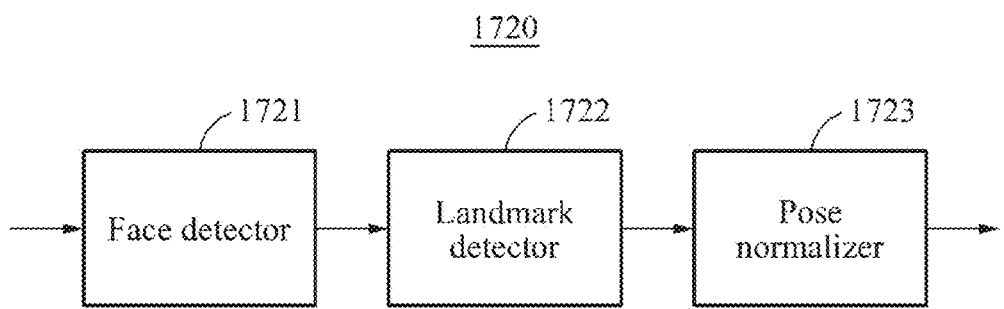

Referring to FIG. 18, the face extractor 1720 may include a face detector 1721, a landmark detector 1722, and a pose normalizer 1723. The face detector 1721 may detect a face region in an input image 1710. The landmark detector 1722 may detect landmarks in the detected face region. The landmarks may be feature points present on an outstanding outline, for example, eyebrows, eyes, a nose, and a mouth. The pose normalizer 1723 may normalize a pose of an image in a predetermined or, alternatively, desired direction, for example, in a frontward direction, using the landmarks.

Figure 19:
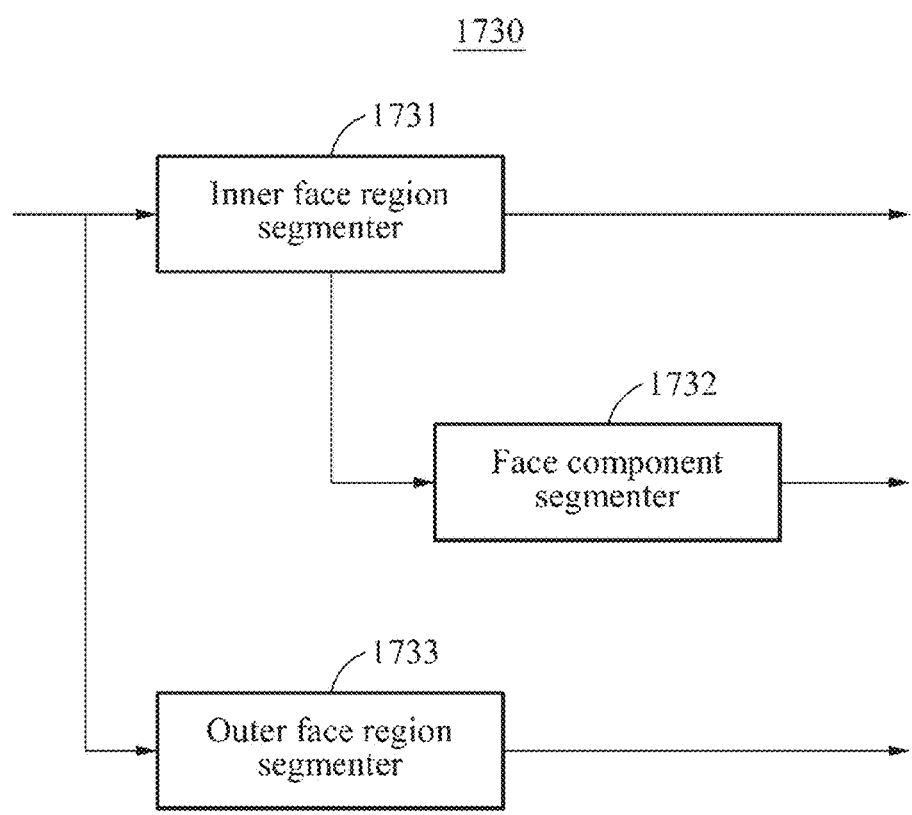

Referring to FIG. 19, the face part segmenter 1730 may include an inner face region segmenter 1731, a face component segmenter 1732, and an outer face region segmenter 1733. The inner face region segmenter 1731 may segment an inner region including major parts, for example, eyes, a nose, and a mouth, from a face image. For example, referring to FIG. 25, the inner face region segmenter 1731 may segment and extract a region corresponding to a holistic face from the face image. The face component segmenter 1732 may segment the inner region into the major parts. For example, referring to FIG. 25, the face component segmenter 1732 may segment and extract regions corresponding to the major parts, for example, eyes, a nose, a mouth, chin/jaw, cheekbone, and noise-mouth, from the region corresponding to the holistic face. The outer face region segmenter 1733 may segment an outer region, for example, hair, from the face image. For example, referring to FIG. 25, the outer face region segmenter 1733 may segment and extract a region corresponding to hair from the face image.

Figure 20:
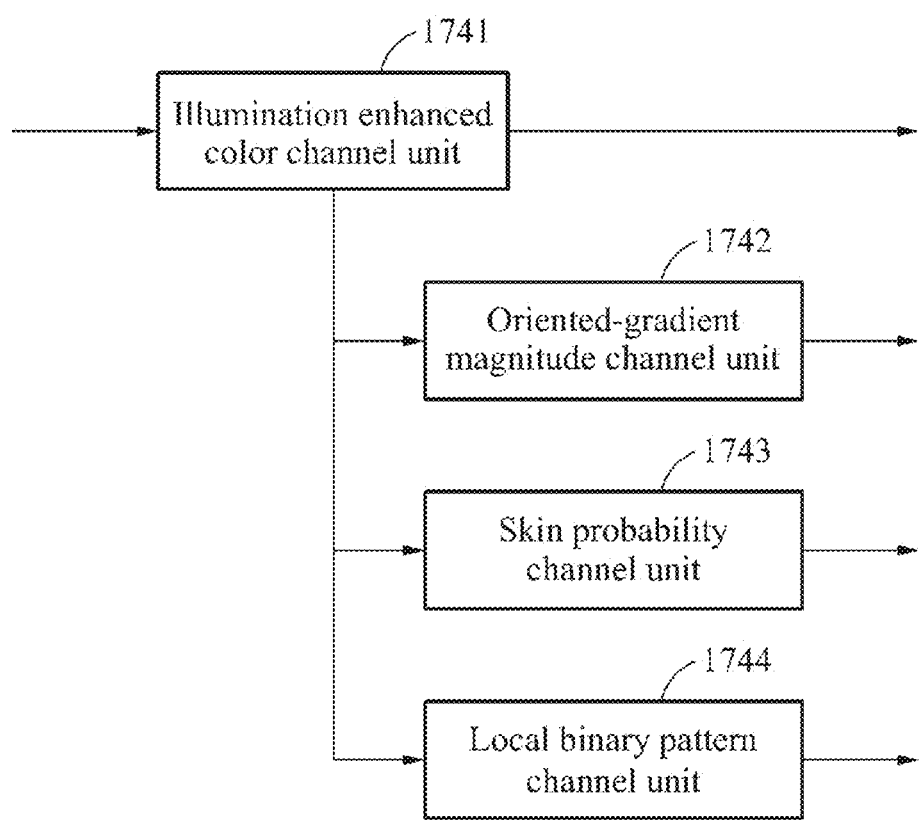

Referring to FIG. 20, the multi-channel generator 1740 may include an illumination enhanced color channel unit 1741, an oriented-gradient magnitude channel unit 1742, a skin probability channel unit 1743, and a local binary pattern channel unit 1744. The illumination enhanced color channel unit 1741 may generate a color channel by removing illumination noise from a face image or a part image. The oriented-gradient magnitude channel unit 1742 may generate an edge channel by calculating an oriented-gradient magnitude in the face image or the part image. The skin probability channel unit 1743 may generate a skin channel by calculating a skin color probability in the face image or the part image. The local binary pattern channel unit 1744 may generate a pattern channel by extracting a texture pattern or a shape pattern from the face image or the part image.

Figure 21:
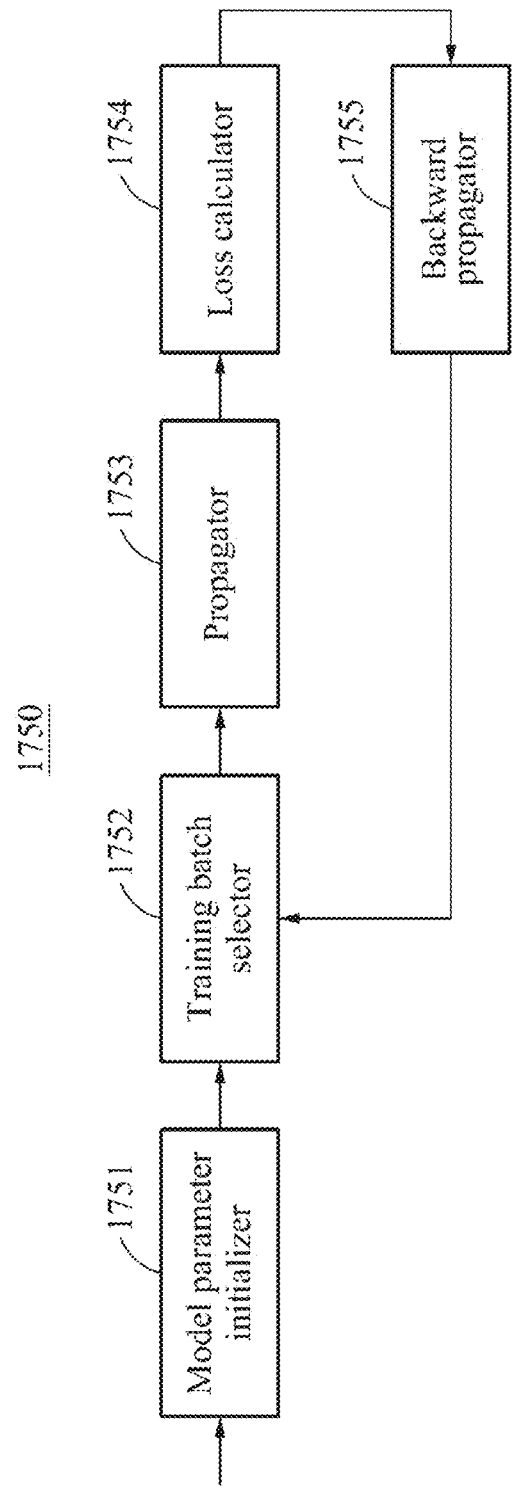

Referring to FIG. 21, the multi-task trainer 1750 may include a model parameter initializer 1751, a training batch selector 1752, a propagator 1753, a loss calculator 1754, and a backward propagator 1755. The model parameter initializer 1751 may initialize model parameters, for example, initial connection weights, and a bias, to train a DCNN. The bias may be threshold information to be used to determine whether nodes included in the DCNN are to be activated. The training batch selector 1752 may select training data for training. The training data may include labeled information, for example, an ID and attributes, and multi-channel data generated by the multi-channel generator 1740. The propagator 1753 may input the training data into the DCNN, and the DCNN may output a resulting value calculated based on a currently set model parameter. The loss calculator 1754 may calculate losses using Equation 4.

$$L(f_{DCNN}(x), l_{attr}, l_{ID}) = L_{attr}(f_{DCNN}(x), l_{attr}) + \lambda \times L_{ID}(f_{DCNN}(x), l_{ID})$$ [Equation 4]

In Equation 4, x denotes an input, $f_{DCNN}(x)$ denotes an output of the DCNN, $l_{attr}$ denotes an actual attribute, $l_{ID}$ denotes an actual ID, $L_{attr}(\ )$ denotes a function used to obtain attribute losses, $L_{ID}(\ )$ denotes a function used to obtain ID losses, $\lambda$ denotes a coefficient used to control a contribution rate of ID losses to attribute losses, and $L(\ )$ denotes a function used to calculate total losses.

$L_{attr}(\ )$, $L_{ID}(\ )$, and $L(\ )$ of Equation 4 are examples of loss functions. According to at least one example embodiment, a cross-entropy may be used as a loss function, for example, according Equation 5.

$$E = -\frac{1}{N}\sum_{n=1}^{n}l_n \log \hat{P}_n$$ [Equation 5]

Referring to Equation 5, N refers to a number of input in a minibatch (e.g., a number of training data used at each of training iterations), $l_n$ refers to an $n^{th}$ input's label, and $\hat{P}_n$ refers to an $n^{th}$ input's predicted probability. For example, $\ln(l_{attr}, l_{ID})$ may be a ground truth label with respect to each of training images and $\hat{P}_n$ may be an estimated probability in response to input a training image to a network. E is a loss value which is output as a result.

A method of calculating losses is not limited to Equation 4. Various modifications may be made the method of calculating losses provided that a technical idea of calculating losses using both physiognomic attribute and an ID is maintained. For example, a hinge loss, a square loss, a softmax loss, a cross-entropy loss, an absolute loss, and an insensitive loss may be used depending on purposes.

The backward propagator 1755 may update the model parameter of the DCNN through backward propagation of the losses. After the model parameter of the DCNN is updated, operations of the training batch selector 1752, the propagator 1753, the loss calculator 1754, and the backward propagator 1755 may be performed iteratively until the training is completed.

Figure 22:
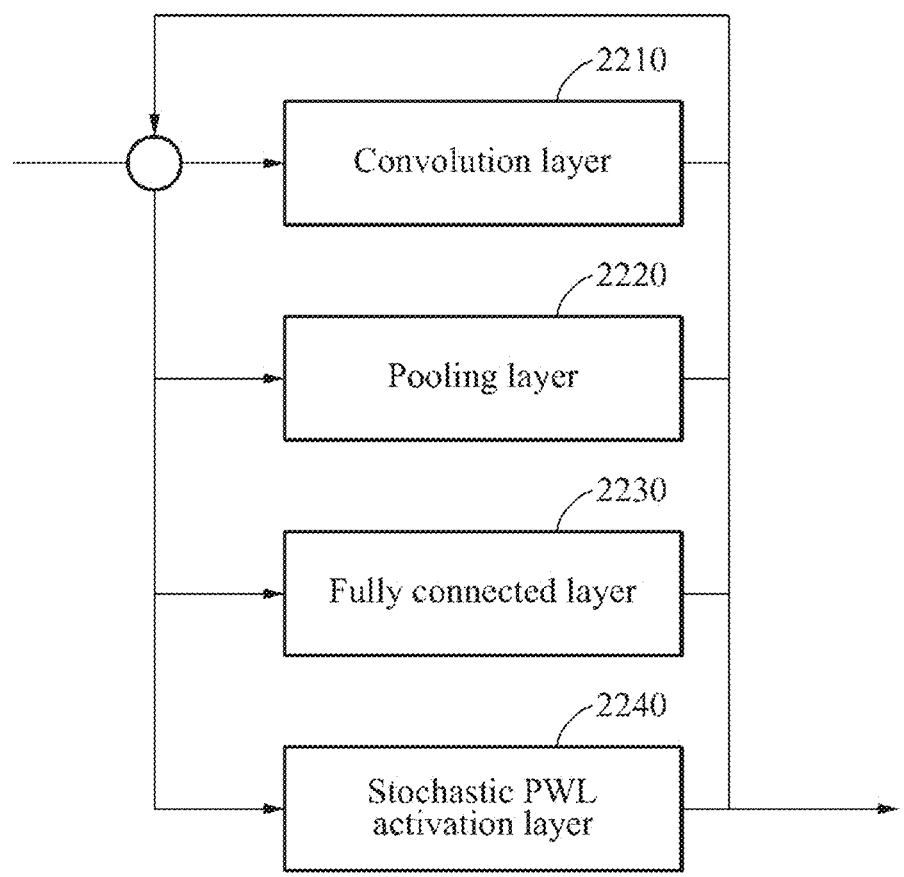

Referring to FIG. 22, a DCNN may include a convolution filtering layer 2210, a pooling layer 2220, a fully connected layer 2230, and a stochastic PWL activation layer 2240. Each layer may be configured repeatedly depending on purposes. In an example, an output of the convolution filtering layer 2210 may be transmitted to the pooling layer 2220, and an output of the pooling layer 2220 may be transmitted to the fully connected layer 2230. In another example, an output of the convolution filtering layer 2210 may be transmitted through the stochastic PWL activation layer 2240 to the pooling layer 2220, and an output of the pooling layer 2220 may be transmitted through the stochastic PWL activation layer 2240 to the fully connected layer 2230. The foregoing configurations of the layers are provided as examples only, and various modifications may be made to the configurations of the layers.

Figure 23:
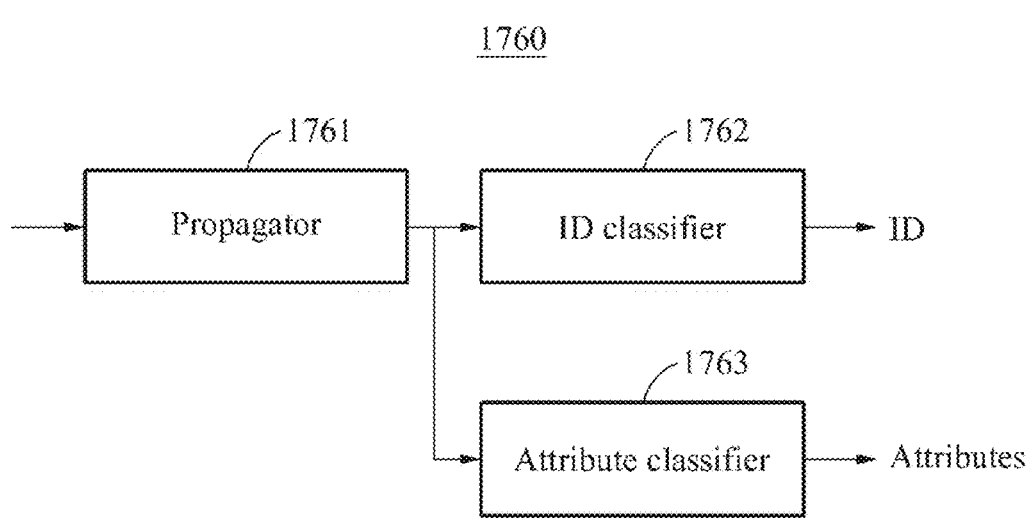

Referring to FIG. 23, the multi-task recognizer 1760 may include a propagator 1761, an ID classifier 1762, and an attribute classifier 1763. The propagator 1761 may forward propagate multi-channel data to a trained recognizer. The ID classifier 1762 and the attribute classifier 1763 may classify an ID and attributes, respectively, using feature values output from a recognizer.

Referring to FIG. 24, the multi-task recognizer 1760 may include a propagator 2410, an ID classifier 2420, an attribute classifier 2430, a feature generator 2440, and a verifier 2450. The multi-task recognizer 1760 may verify whether two input images match using a trained recognizer. The propagator 2410 may forward propagate multi-channel data of the two input images to the trained recognizer. The ID classifier 2420 and the attribute classifier 2430 may classify an ID and attributes of each of the two input images, respectively, using feature values output from the recognizer.

The feature generator 2440 may generate a feature vector for each of the two input images by combining outputs of the ID classifier 2420 and the attribute classifier 2430. The verifier 2450 may calculate a similarity distance between the generated feature vectors. When the calculated similarity distance is relatively short, an authenticity may be determined as true. Conversely, when the calculated similarity is relatively long, the authenticity may be determined as false.

In some cases, a separate recognizer, for example, a support vector machine (SVM), a random forest, and a joint Bayesian, may be trained using an output of the feature generator 2440. In this example, the verifier 2450 may perform the verification by applying the output of the feature generator 2440 to the separate pre-trained recognizer.

FIGS. 25 through 30 illustrate attributes according to at least some example embodiments. Referring to FIG. 25, different attributes may be set for each part of a face. Referring to FIGS. 26 through 30, each attribute may be expressed in at least one dimension, and may be used to train the DCNN described above.

At least some example embodiments may provide technology advantageous to face recognition by segmenting a face into an inner face, eyes, a nose, ears, a mouth, and an outer face based on physiognomy, and recognizing attributes of each part. At least some example embodiments may provide technology that optimally recognizes an actual image other than training data based on training-based features other than hand-crafted features. At least some example embodiments may provide technology that performs multi-task recognition of face attributes and face recognition based on physiognomy corresponding to mid-level features, using a single recognizer.

At least some example embodiments may increase a recognition performance by considering face attributes and a recognition accuracy simultaneously when training a face recognizer. At least some example embodiments may increase a recognition performance with respect to actual data using a combination of a number of stochastic linear functions as an activation function.

At least some example embodiments may generalize features, by not using hand-crafted features. Consequently, a technical advantage is provided in the form of the ability to perform a recognition which is tailored for a real image rather than training data. Further, at least some example embodiments may not require an optimized combination of features during a training procedure, by not using the hand-crafted features. As a result, at least some example embodiments provide reduced complexity in comparison to related image recognition techniques. Further, related image recognition methods, which use hand-crafted features, may be more suitable for searching an image than recognizing a face. On the other hand, at least some example embodiments provide an image recognition method that is more suitable for recognizing a face in comparison to related image recognition methods. Furthermore, at least some related image recognition methods are limited to a certain number of training data. For example, a least some related methods perform training with around 100,000 elements training data or less. On the other hand, at least some example embodiments are capable of performing training with more than 100,000,000 elements of training data. Further, at least some related image recognition methods cannot be commonly used to solve various problems of image recognition. Some related image recognition methods are limited to using a specific feature to address a specific image recognition problem. For example, Local Binary Pattern (LBP) may be a desirable feature for face recognition, and histogram of oriented gradients (HoG) or single invariant feature transform (SIFT) may be a desirable feature for object recognition. On the other hand, at least some example embodiments can provide the technical advantage of being commonly used to solve multiple, various problems of image recognition (e.g., ID recognition and attribute recognition) by deep-learning a feature representation using, for example, one or more DCNNs.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. According to at least some example embodiments, the program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa. According to at least one example embodiment, the one or more software modules may be stored in a memory executed, for example, by one or more processors coupled to the memory such that the one or more processors perform the operations of one, some or all of the above-referenced example embodiments.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A recognition method comprising:
   receiving an input image including a face region; and
   recognizing a plurality of elements of the input image using a single recognizer including a convolutional neural network (CNN) pre-trained to recognize the plurality of elements simultaneously,
   the plurality of elements including elements associated with the face region.

2. The recognition method of claim 1, wherein the plurality of elements comprises:

an identity (ID) that identifies the input image; and
at least one attribute associated with the input image.

3. The recognition method of claim 2, wherein the ID identifies at least an object included in the input image.

4. The recognition method of claim 2, wherein the at least one attribute comprises at least one of:
a gender corresponding to the face region;
an age corresponding to the face region;
an ethnic group corresponding to the face region;
an attractiveness corresponding to the face region;
a facial expression corresponding to the face region; or
an emotion corresponding to the face region.

5. The recognition method of claim 4, wherein the at least one attribute includes at least two different attributes from among the gender, the age, the ethnic group, the attractiveness, and the facial expression.

6. The recognition method of claim 1, wherein the recognizer includes a neural network, and
the recognizing includes calculating feature values corresponding to the plurality of elements based on pre-learned weights between nodes included in the neural network.

7. The recognition method of claim 1, wherein the recognizing includes generating a plurality of feature images based on the input image.

8. The recognition method of claim 7, wherein the plurality of feature images comprises at least one of:
a color channel image from which illumination noise is removed;
an oriented-gradient magnitude channel image;
a skin probability channel image; or
a local binary pattern channel image.

9. The recognition method of claim 7, wherein the recognizing comprises:
filtering the plurality of feature images; and
outputting feature values corresponding to the plurality of elements based on an output of the filtering.

10. The recognition method of claim 9, wherein the recognizing further comprises:
recognizing the plurality of elements based on the feature values.

11. The recognition method of claim 1, wherein the recognizing comprises:
acquiring a plurality of part images corresponding to parts of a face included in the input image; and
generating a plurality of feature images corresponding to each of the plurality of part images.

12. The recognition method of claim 11, wherein the recognizing comprises:
outputting first feature values corresponding to the plurality of elements based on outputs of a plurality of part recognition modules,
wherein each of the plurality of part recognition modules is configured to
filter feature images of a corresponding part image; and
output feature values corresponding to elements associated with the corresponding part image based on an output of the filtering.

13. The recognition method of claim 12, wherein the recognizing further comprises:
recognizing the plurality of elements based on the output first feature values.

14. The recognition method of claim 1, further comprising:
comparing the plurality of elements to a plurality of elements associated with a reference image; and
determining whether the input image matches the reference image based on a result of the comparing.

15. The recognition method of claim 14, wherein the comparing comprises:
generating a feature vector based on the plurality of elements; and
comparing the feature vector to a reference vector of the reference image.

16. A method of training a recognizer, the method comprising:
receiving a training image; and
training a recognizer configured to recognize a plurality of elements of an input image that includes a face region, based on the training image and a plurality of elements labeled in the training image, such that the recognizer includes a convolutional neural network (CNN) pre-trained to recognize the plurality of elements of the input image simultaneously,
the plurality of elements of the input image including elements associated with the face region.

17. The method of claim 16, wherein the plurality of elements comprise:
an identity (ID) that identifies the training image; and
at least one attribute associated with the training image.

18. The method of claim 17, wherein the ID includes information that identifies at least an object included in the training image.

19. The method of claim 17, wherein the at least one attribute comprises at least one of:
a gender corresponding to the face region;
an age corresponding to the face region;
an ethnic group corresponding to the face region;
an attractiveness corresponding to the face region;
a facial expression corresponding to the face region; or
an emotion corresponding to the face region.

20. The method of claim 19, wherein the at least one attribute includes at least two different attributes from among the gender, the age, the ethnic group, the attractiveness, and the facial expression.

21. The method of claim 16, wherein the training comprises calculating losses corresponding to the plurality of elements.

22. The method of claim 21, wherein the recognizer comprises a neural network, and
the training includes training the recognizer to learn weights between nodes included in the neural network based on the losses.

23. The method of claim 16, wherein the recognizer comprises a neural network, and
the training includes activating nodes included in the neural network based on a stochastic piecewise linear (PWL) model.

24. The method of claim 16, wherein the training comprises generating a plurality of feature images based on the training image.

25. The method of claim 24, wherein the plurality of feature images comprises at least one of:
a color channel image from which illumination noise is removed;
an oriented-gradient magnitude channel image;
a skin probability channel image; or
a local binary pattern channel image.

26. The method of claim 24, wherein the training comprises:
training the recognizer to filter the plurality of feature images; and training the recognizer to output feature values corresponding to the plurality of elements based on an output of the filtering of the plurality of feature images.

27. The method of claim 26, wherein the training further comprises:
training the recognizer to recognize the plurality of elements based on the output feature values.

28. The method of claim 16, wherein the training comprises:
acquiring a plurality of part images corresponding to parts of a face included in the training image.

29. The method of claim 28, wherein different elements are labeled in the plurality of part images.

30. The method of claim 28, wherein the training further comprises:
generating a plurality of feature images corresponding to each of the plurality of part images.

31. The method of claim 30, wherein the training comprises:
training the recognizer to output first feature values corresponding to the plurality of elements based on outputs of a plurality of part recognition modules corresponding to the plurality of part images; and
for each of the plurality of part recognition modules,
training the part recognition module to filter feature images of a corresponding part image, and
training the part recognition module to output feature values corresponding to elements associated with the corresponding part image based on an output of the filtering.

32. The method of claim 31, wherein the training further comprises:
training the recognizer to recognize the plurality of elements based on the output first feature values.

33. A non-transitory computer-readable medium comprising program code that, when executed by a processor, performs functions according to the method of claim 16.

34. A recognition apparatus comprising:
a memory storing instructions; and
one or more processors configured to execute the instructions such that the one or more processors are configured to,
receive an input image including a face region; and
recognize a plurality of elements of the input image using a single recognizer including a convolutional neural network (CNN) pre-trained to recognize the plurality of elements simultaneously,
the plurality of elements including elements associated with the face region.

35. An apparatus for training a recognizer, the apparatus comprising:
a memory storing instructions; and
one or more processors configured to execute the instructions such that the one or more processors are configured to,
receive a training image; and
train a recognizer configured to recognize a plurality of elements of an input image that includes a face region, based on the training image and a plurality of elements labeled in the training image, such that the recognizer includes a convolutional neural network (CNN) pre-trained to recognize the plurality of elements of the input image simultaneously,
the plurality of elements of the input image including elements associated with the face region.

* * * * *